United States Patent Office 3,576,798
Patented Apr. 27, 1971

3,576,798
1,2,3,4-TETRAHYDRO-5H-[1]BENZOPYRANO
[3,4-d]PYRIDINES
Harry G. Pars, Lexington, and Felix E. Granchelli, Arlington, Mass., assignors to Arthur D. Little Inc., Cambridge, Mass.
No Drawing. Filed Sept. 27, 1965, Ser. No. 490,687
Int. Cl. C07d 7/32
U.S. Cl. 260—240    23 Claims

ABSTRACT OF THE DISCLOSURE

Novel 8-alkyl- (and 8-cycloalkyl-lower-alkyl-) 10-hydroxy - 5,5 - di-loweralkyl - 1,2,3,4 - tetrahydro - 5 - H-[1]-benzopyrano [3,4-d] pyridines and certain ether and ester derivatives thereof possess central nervous depressant activity and are useful as psychotropic agents.

---

This invention relates to novel chemical compositions of matter known in the art of chemistry as 1,2,3,4-tetrahydro-5H-[1]benzopyrano[3,4-d]pyridines, 1,2,3,4,13,14-hexahydro-5H-[1]-benzopyrano[3,4-d]pyridines, to intermediates therefore and to the preparation of the same.

The invention sought to be patented, in its composition aspect, resides in the concept of a class of chemical compounds which we designated as 8-alkyl- (and 8-cycloalkyl-lower-alkyl-) - 10 - hydroxy - 4,5 - di-lower-alkyl-1,2,3,4-tetrahydro-5H-[1]benzopyrano[3,4-d]pyridines, 8 - alkyl- (and 8-cycloalkyl-lower-alkyl-) 10-hydroxy-5, 5-di-lower-alkyl-1,2,3,4,13,14 - hexahydro - 5H - [1] - benzopyrano-[3,4-d]pyridines and certain ester and ether derivatives thereof. The tangible embodiments of this composition aspect of the invention possess the inherent use characteristics of having CNS depressant properties as determined by standard pharmacological test procedures.

Without limiting the generality of the foregoing, illustrative and preferred embodiments of our 8-alkyl- (and 8-cycloalkyl-lower-alkyl-) 10 - hydroxy-5,5-di-lower-alkyl-1,2,3,4-tetrahydro - 5H - [1]benzopyrano[3,4-d]pyridines and 8 alkyl- (and 8-cycloalkyl-lower-alkyl-) 10-hydroxy-5,5-di-lower-alkyl - 1,2,3,4,13,14 - hexahydro-5H-[1]benzopyrano[3,4-d]pyridines are those of Formulas I and II, respectively:

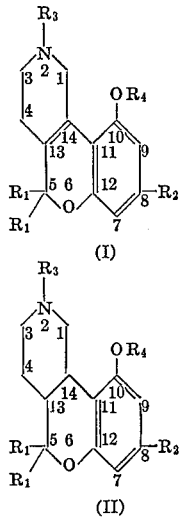

wherein $R_1$ is lower-alkyl; $R_2$ is a member of the group consisting of alkyl and cycloalkyl-lower-alkyl; $R_3$ is a member of the group consisting of hydrogen, lower-alkanoyl, cycloalkyl-lower-alkyl, cycloalkyl-lower-alkanoyl, lower-alkenyl, lower-alkynyl, halo-lower-alkenyl (including fluoro, chloro-, bromo-, and iodo-lower-alkenyl), phenyl-lower-alkyl, phenyl-lower-alkenyl, and phenyl-lower-alkynyl; and $R_4$ is a member of the group consisting of hydrogen, lower-alkyl, lower-alkanoyl, carbamyl, N-lower-alkylcarbamyl, N,N-di-lower-alkylcarbamyl, and phosphonyl.

As used herein, the term "lower-alkyl" means saturated, monovalent aliphatic-radicals, including straight and branched-chain radicals of from one to six carbon atoms, as illustrated by, but not limited to methyl, ethyl, propyl, isopropyl, butyl, sec.-butyl, amyl, hexyl, and the like.

As used herein, the term "alkyl" means saturated, monovalent aliphatic radicals, including straight and branched-chain radicals of from one to twenty carbon atoms, as illustrated by, but not limited to methyl, n-amyl, n-hexyl, 2-heptyl, n-heptyl, 3-methyl-2-octyl, n-octyl, 2-nonyl, 2-tetradecyl, n-hexadecyl, 2-eicosanyl, and the like.

As used herein, the term "lower-alkenyl" means monovalent, aliphatic-radicals of from three to seven carbon atoms which contain at least one double bond, and are either straight or branched-chain, as illustrated by, but not limited to 1-(2-propenyl), 1-(3-methyl-2-propenyl), 1-(1,3-dimethyl-2-propenyl), 1-(2-hexenyl), and the like.

As used herein, the term "lower-alkynyl" means monovalent, aliphatic-radicals, of from three to seven carbon atoms which contain at least one triple bond, and are either straight or branched, as illustrated by, but not limited to 1-(2-propynyl), 1-(1-methyl-2-propynyl), 1-(2-heptynyl), and the like.

As used herein, the term "cycloalkyl" means cyclic, saturated aliphatic-radicals of from three to eight carbon atoms, as illustrated by, but not limited to cyclopropyl, cyclobutyl, 2-methylcyclobutyl, cyclohexyl, 4-methylcyclohexyl, cyclooctyl, and the like.

As used herein, the term "lower-alkanoyl" means saturated, monovalent, aliphatic radicals, derived from a monocarboxylic acid, including straight or branched-chain radicals of from one to six carbon atoms, as illustrated by, but not limited to formyl, acetyl, propionyl, α-methylpropionyl, butyryl, hexanoyl, and the like.

As used herein, the terms "phenyl-lower-alkyl," "phenyl-lower-alkenyl," and "phenyl-lower-alkynyl" means a monovalent radical consisting of a phenyl nucleus bonded to the rest of the molecule, respectively, through a divalent lower-alkylene radical of from one to four carbon atoms as illustrated by, but not limited to methylene, 1,1 - ethylene, 1,2 - ethylene, 1,3 - propylene, 1,2-propylene, 1,4 - butylene, and the like, or through a divalent lower-alkenylene radical of from two to four carbon atoms, as illustrated by, but not limited to 1,2-ethenylene, 1,3 - (1 - propenylene), 1,3 - (1 - butenylene), 1,4 - (2 - butenylene), and the like, or through a divalent lower-alkynylene radical of from two to four carbon atoms, as illustrated by, but not limited to 1,2 - ethynylene, 1,3 - propynylene, 1,3 - (1 - butynylene), and the like. Here and elsewhere throughout this specification, it will be understood the benzene ring of phenyl can bear any number and kind of substituents such as would occur to the man skilled in organic chemistry. Solely for illustration, and without limitation, such substituents include lower-alkyl, lower-alkoxy, halo (chloro, bromo, iodo, or fluoro), nitro, lower-alkylmercapto, and the like.

The invention, in one of its process aspects, is described as residing in the process of catalytically debenzylating, with hydrogen in the presence of a catalyst, the compounds of Formula I hereinabove where $R_3$ is benzyl to produce the compounds of Formula I where $R_3$ is hydrogen. The reaction is preferably carried out in an organic solvent inert under the conditions of the reaction, for example methanol, ethanol, isopropanol, and the like. Suitable catalysts are platinum or palladium-on-charcoal. A preferred catalyst is palladium-on-charcoal.

The invention, in another of its process aspects, is described as residing in the process of reacting the compounds of Formula I or II, where $R_3$ is hydrogen, with a cycloalkyl-lower-alkyl halide, lower-alkenyl halide, lower-alkynyl halide, halo-lower-alkenyl halide, phenyl-lower-alkyl halide, pheny-lower-alkenyl halide, or phenyl-lower-alkynyl halide to prepare the compounds of Formula I or II where $R_3$ is, respectively, cycloalkyl-lower-alkyl, lower-alkenyl, lower-alkynyl, halo-lower-alkenyl, phenyl-lower alkyl, phenyl-lower-alkenyl, or phenyl-lower-alkynyl. The reaction is preferably carried out in an organic solvent inert under the conditions of the reaction, for example methanol, ethanol, isopropanol, or dimethylformamide, and in the presence of an acid-acceptor. The purpose of the acid-acceptor is to take up the hydrogen halide split out during the course of the reaction and is a basic substance which forms water-soluble salts readily separable from the reaction mixture. Suitable acid-acceptors are alkali metal carbonates or bicarbonates, for example sodium, or potassium carbonate, or bicarbonate, or alkali metal hydroxides, for example sodium or potassium hydroxide. The reaction can also be carried out in the presence of a molar excess of the base of Formula I or II where $R_3$ is hydrogen. A preferred acid-acceptor is sodium carbonate, and a preferred solvent is ethanol.

The invention, in still another proces aspect, is described as residing in the process of reacting the compounds of Formula I or II, where $R_3$ is hydrogen, with an acid halide or anhydride of a lower-alkanoic, cycloalkyl-lower-alkanoic, or phenyl-lower-alkanoic acid to produce the compounds of Formulas I and II where $R_3$ is, respectively, lower-alkanoyl, cycloalkyl-lower-alkanoyl, or phenyl-lower-alkanoyl. The reaction is preferably carried out in an organic solvent inert under the conditions of the reaction, for example benzene, toluene, xylene, and the like, and in the presence of a basic catalyst, for example pyridine, triethylamine, dimethylaniline, and the like. A preferred solvent is benzene, and a preferred basic catalyst is pyridine.

The invention, in still another process aspect, is described as residing in the process of reducing, with an alkali metal aluminum hydride, the compounds of Formula I or II where $R_3$ is cycloalkyl-lower-alkanoyl or phenyl-lower-alkanoyl and $R_4$ is hydrogen or lower-alkyl to produce the compounds of Formula I where $R_3$ is, respectively, cycloalkyl-lower-alkyl or phenyl-lower-alkyl. The reaction is preferably carried out in an organic solvent inert under the conditions of the reaction, for example diethyl ether, tetrahydrofuran, dibutyl ether, and the like.

The invention, in still another of its process aspects, is described as residing in the process of reducing with hydrogen over a suitable catalyst the 8-alkyl- (and 8-cycloalkyl-lower-alkyl-) 10 - hydroxy - 5,5 - di-lower-alkyl - 1,2,3,4 - tetrahydro - 5H - [1]-benzopyrano [3,4-d]pyridines of Formula I where $R_1$, $R_2$, and $R_4$ have the meanings given above and $R_3$ is hydrogen, lower-alkanoyl, cycloalkyl-lower-alkyl, cycloalkyl-lower-alkanoyl, or phenyl-lower-alkyl to produce the 8-alkyl- (and 8 - cycloalkyl-lower-alkyl) 10 - hydroxy - 5,5 - di-lower-alkyl - 1,2,3,4,13,14 - hexahydro - 5H - [1]benzopyrano [3,4-d]pyridines of Formula II where $R_1$, $R_2$, $R_3$ and $R_4$ have the meanings given above. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of Formulas I and II, i.e. the compounds where $R_4$ is lower-alkyl, lower-alkanoyl, carbamyl, N-lower-alkylcarbamyl, N,N-di-lower-alkyl-carbamyl, or phosphonyl are prepared by reacting the corresponding compound where $R_4$ is hydrogen, preferably in the presence of a basic catalyst, with a lower-alkyl halide, to produce the compounds where $R_4$ is lower-alkyl; with a lower-alkanoic anhydride (or mixed anhydride), to produce the compounds where $R_4$ is lower-alkanoyl; with a molar equivalent of phosgene followed by reaction of the resulting chloroformate with ammonia, a lower-alkylamine, or a di-lower-alkylamine, to produce the compounds where $R_4$ is, respectively, carbamyl, N-lower-alkylcarbamyl, or N,N-di-lower-alkyl-carbamyl; or with one molar equivalent amount of phosphorus oxychloride followed by reaction of the resulting dichlorophosphinate with aqueous sodium or potassium carbonate, to produce the compounds where $R_4$ is phosphonyl. Suitable solvents are benzene, toluene, xylene and the like, and suitable basic catalysts are alkali metal carbonates, bicarbonates, or hydroxides, dimethylaniline, pyridine, and the like.

The compounds of Formula I and $R_3$ is benzyl, and which, as described hereinabove, are used as intermediates for the preparation of the compounds of Formulas I and II where $R_3$ has the other various meanings given hereinabove, are in turn prepared by reacting an 8-alkyl- (or 8-cycloalkyl-lower-alkyl-) 10-hydroxy-5-oxo-1,2,3,4-tetrahydro-5H-[1]benzopyrano[3,4-d]pyridine having the Formula III

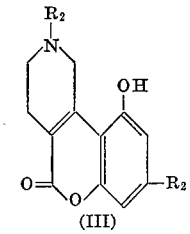

(III)

with a lower-alkyl magnesium halide as illustrated by the equation:

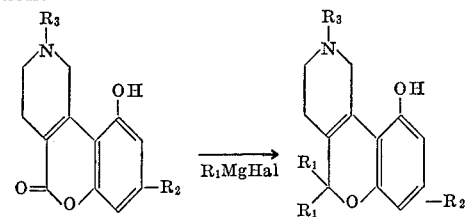

where $R_1$, $R_2$, and $R_3$ have the meanings given hereinabove, and Hal represents halogen. The reaction is carried out in an organic solvent inert under the conditions of the reaction. Suitable solvents are diethyl ether, dibutyl ether, tetrahydrofuran, anisole, pyridine, and the like. It is preferred to add a solution of the 8-alkyl- (or 8-cycloalkyl-lower-alkyl-) 10-hydroxy - 5 - oxo-1,2,3,4-tetrahydro-5H-[1]benzopyrano[3,4-d]pyridine in a pyridine or anisole solution, or in a mixture of these solvents, to a solution of the Grignard reagent in anisole.

The compounds of Formula III where $R_3$ is benzyl in turn are prepared by reacting a 1-benzyl-4-carbo-lower-alkoxy-3-piperidone of Formula IV with a 5-alkylresorcinol (or a 5-cycloalkyl-lower-alkylresorcinol) of Formula V. The reaction is carried out in a mixture of concentrated sulfuric acid and phosphorus oxychloride or in the presence of other condensation agents such as aluminum chloride, hydrogen chloride, or polyphosphoric acid and is illustrated by the equation:

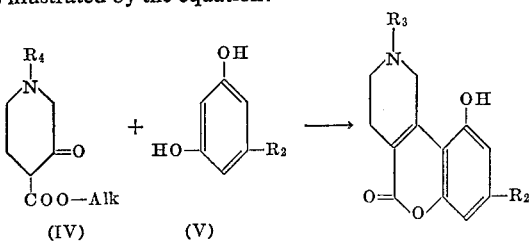

(IV) (V)

where $R_2$ and $R_3$ are defined as above.

The intermediate 5-alkyl- or 5-cycloalkyl-lower-alkyl-resorcinols of Formula V are conveniently prepared by methods generally known in the art comprising dehydration of a 3,5-di-lower-alkoxyphenyl alkyl (or cycloalkyl-lower-alkyl) carbinol, reduction of the resulting 3,5-di-lower-alkoxyphenylalkene (or di-lower-alkoxyphenyl-cycloalkyl-lower-alkene), and hydriodic acid cleavage of the ether groups to the corresponding 5-alkyl- (or 5-cycloalkyl-lower-alkyl-)resorcinol. The starting carbinols in turn are prepared by reaction of an appropriate Grignard reagent with a 3,5-di-lower-alkoxybenzoic acid ester, amide, or 3',5'-di-lower-alkoxy-alkanophenone (or 3',5'-di-lower-alkoxy-cycloalkyl-lower-alkanophenone).

The intermediate 1-benzyl-4-carbo-lower-alkoxy-3-piperidones of Formula IV are prepared by the method of Phill and McElvain, J. Am. Chem. Soc. 55, 1233 (1933) and of McElvain and Vozza, J. Am. Chem. Soc. 71, 896 (1948).

Due to the presence of a basic tertiary amino grouping, the compounds of this invention form acid-addition and quaternary ammonium salts. The compounds of Formulas I and II, in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or different acid-addition salt. Thus the novel bases and all of their acid-addition salts are readily interconvertible.

The quarternary ammonium salts of the compounds of Formulas I and II are obtained by the addition of esters of strong acids to the free base form of the compounds, said esters having a molecular weight less than about 300. A preferred class of esters comprises alkyl, alkenyl, and phenyl-lower-alkyl esters of strong inorganic acids or or-organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, pentachlorobenzyl chloride, p-nitrobenzyl chloride, p-methoxybenzyl chloride, and the like.

It will thus be appreciated that each of Formulas I and II not only represents the structural configuration of the bases of our invention but each is also representative of the respective structural entity which is common to all of our respective compounds of Formulas I and II whether in the form of the free bases or in the form of the salts of the bases. We have found that by virtue of this common structural entity, the bases and their acid-addition salts as well as the quaternary ammonium salts have inherent pharmacodynamic activity of a type to be more fully described hereinbelow. This inherent pharmacodynamic activity can be enjoyed in useful form for pharmaceutical purposes by employing the free bases themselves or the acid-addition or quaternary ammonium salts formed from pharmaceutically-acceptable acids or esters of strong acids, that is, acids or esters whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack or crystalline character may make some particular salt species unsuitable or less desirable for use as such in a given pharmaceutical application, the water-insoluble or toxic salts can be converted to the corresponding pharamaceutically-acceptable bases by decomposition of the acid-addition salt with aqueous base as explained above, or alternatively, the acid-addition salt can be converted to any desired pharmaceutically-acceptable acid-addition salt by double decomposition reactions involving the anion, for example, by ion-exchange procedures.

As in the case of the acid-addition salts, water-insolubility, high toxicity, or lack or crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Moreover, apart from their usefulness in pharmaceutical applications, our salts are useful as characterizing or identifying derivatives of the free bases or in isolation or purification procedures. Such characterizing or purification acid-addition salt derivatives, like all of the acid-addition salts, can, if desired, be used to regenerate the pharmaceutically-acceptable free bases by reaction of the salts with aqueous base, or alteratively the acid-addition or quaternary ammonium salt can be converted to a pharmaceutically-acceptable salt by, for example, ion-exchange procedures.

It will be appreciated from the foregoing that all of the acid-addition and quaternary ammonium salts of our new bases are useful and valuable compounds regardless of considerations of solubility, toxicity, physical form, and the like, and accordingly are within the purview of the instant invention.

The novel features of the compounds of the invention, then, resides in the concept of the bases and the cationic forms of the new compounds of Formulas I and II and not in any particular acid or ester moiety or anion associated with the salt forms of the compounds; rather, the acid or ester moieties or anions which can be associated in the salt forms are in themselves neither novel nor critical and therefore can be any anion or acid-like substance capable of salt formation with bases. In fact, in aqueous solutions, the base form or water-soluble acid-addition salt form of the compounds of the invention both possess a common protonated cation or ammonium ion.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, benzenesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite ®XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and an ester of a strong acid in an inert solvent. Heating may be used to facilitate the reaction, although salt formation usually takes place readily at room temperature. The quaternary ammonium salt separates directly or can be obtained by concentration of the solution.

The compounds of Formulas I and II have been shown to possess central nervous system depressant activity as evidenced by gross overt changes induced by intravenous administration in mice in standard tests involving observations of psychomotor activity, reactivity to stimuli, and ability to perform normal, non-conditioned motor tasks. The activity indicates their usefulness as psychotropic agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The molecular structures of the compounds of our invention were assigned on the basis of study of their infrared, ultraviolet and NMR spectra and their transformation products, and confirmed by the correspondence of calculated and found values for the elementary analyses for representative examples.

The following examples will further illustrate the invention without, however, limiting it thereto.

EXAMPLE 1

2-benzyl-5,5-dimethyl-10-hydroxy-8-(3-methyl-2 - octyl)-1,2,3,4-tetrahydro-5H-[1]benzopyrano[3,4-d]pyridine (A) 2-benzyl-10-hydroxy-8 - (3-methyl-2-octyl-5-oxo-1,2,3,4-tetrahydro - 5H - [1]benzopyrano[3,4-d]pyridine hydrochloride.—To a mixture of 5.4 g. (0.023 mole) of 5-(3-methyl-2-octyl)resorcinol and 5.8 g. (0.020 mole) of N-benzyl-4-carbethoxy-3-piperidone [prepared according to the procedure of Iselin et al., Helv. Chim. Acta, 37, 178–184 (1954) and McElvain et al., J. Am. Chem. Soc. 71, 896–900 (1948)] was added dropwise with cooling 10.5 ml. of concentrated sulfuric acid. The mixture was then treated all at once with 3 ml. of phosphorus oxychloride, stirred at room temperature for twenty-four hours and then poured into an excess of aqueous sodium bicarbonate. The gum which separated was taken into chloroform, and the organic solution was washed first with aqueous sodium bicarbonate, then with water, and dried, first by azeotropic distillation, and then over anhydrous sodium sulfate. The chloroform solution was taken to dryness, and the residue extracted with acetonitrile and filtered. The combined filtrates were evaporated to dryness giving a dark, viscous gum which was dissolved in ethyl acetate and treated with a solution of concentrated hydrochloric acid in ethyl acetate. The solid which separated was collected, washed with ethyl acetate, and dried to give 2.3 g. of 2 - benzyl-10-hydroxy-8-(3-methyl-2-octyl)-5-oxo-1,2,3,4 - tetrahydro - 5H - [1]benzopyrano [3,4-d]pyridine hydrochloride, M.P. 217–222° C. (dec.). (Free base melts 137–138° C.).

(B) The latter (4.3 g., 0.01 mole), in the form of the free base, was dissolved in 30 ml. of dry anisole, and the solution added dropwise to a solution containing 0.1 mole of freshly prepared methyl magnesium iodide in 50 ml. of anisole. The solution was stirred overnight at 50° C., cooled, and the excess Grignard reagent decomposed with 50 ml. of water. The solution was acidified with 100 ml. of 4 N sulfuric acid, the anisole was steam distilled from the mixture, and the residual solution was basified with solid sodium carbonate and filtered. Extraction of the solid filter with cold acetonitrile, filtration of the extracts, and evaporation of the latter to dryness afforded 5.2 g. of a mossy-green solid, M.P. 92–112° C., which was further extracted with ether leaving 2.4 g. of a light blue solid, M.P. 197–200° C. Recrystallization of the latter from an ethyl ether-ethyl acetate mixture afforded 2 - benzyl-5,5-dimethyl-10-hydroxy-8-(3-methyl-2-octyl)-1,2,3,4 - tetrahydro - 5H-[1]benzopyrano[3,4-d]pyridine, M.P. 202–205° C.

EXAMPLE 2

2-benzyl-10-hydroxy-5,5,8-trimethyl-1,2,3,4-tetrahydro-5H-[1]benzopyrano[3,4-d]pyridine (A) 2 - benzyl - 10 - hydroxy-8-methyl-5-oxo-1,2,3,4-tetrahydro - 5H - [1]benzopyrano[3,4-d]pyridine.—Following a procedure similar to that described in Example 1A hereinabove, N-benzyl-4-carbethoxy-3-piperidone is reacted with 5-methylresorcinol to give 2-benzyl-10-hydroxy-8-methyl - 5 - oxo-1,2,3,4-tetrahydro-5H-[1]benzopyrano[3,4-d]pyridine.

(B) The latter is reacted with methyl magnesium iodide following the procedure of Example 1B hereinabove to give 2-benzyl-10-hydroxy - 5,5,8 - trimethyl-1,2,3,4-tetrahydro-5H-[1]benzopyrano[3,4-d]pyridine.

EXAMPLE 3

2-benzyl - 5,5-di-(1-hexyl)-10-hydroxy-8-methyl-1,2,3,4-tetrahydro-5H-[1]benzopyrano[3,4-d]pyridine By reacting 2-benzyl-10-hydroxy-8-methyl-5-oxo-1,2,3,4-tetrahydro - 5H-[1]benzopyrano[3,4-d]pyridine with n-hexyl magnesium bromide, using the manipulative procedure described above in Example 1B, there is obtained 2-benzyl-5,5-di-(1-hexyl) - 10 - hydroxy-8-methyl-1,2,3,4-tetrahydro-5H-[1]benzopyrano[3,4-d]pyridine.

EXAMPLE 4

2-benzyl-5,5-dimethyl-10-hydroxy-8-(1-pentyl)-1,2,3,4-tetrahydro-5H-[1]benzopyrano[3,4-d]pyridine (A) 2-benzyl - 10 - hydroxy-5-oxo-8-(1-pentyl)-1,2,3,4-tetrahydro - 5H - [1]benzopyrano[3,4-d]pyridine.—Following a procedure similar to that described in Example 1A hereinabove, 5-(1-pentyl)resorcinol is reacted with N-benzyl-4-carbetoxy-3 - piperidone hydrochloride in the presence of concentrated sulfuric acid and phosphorus oxychloride to give 2 - benzyl - 10-hydroxy-5-oxo-8-(1-pentyl)-1,2,3,4-tetrahydro - 5H - [1]benzopyrano[3,4-d] pyridine.

(B) The latter is reacted with methyl magnesium iodide following the procedure of Example 1B hereinabove to give 2-benzyl - 5,5 - dimethyl-10-hydroxy-8-(1-pentyl)-1,2,3,4-tetrahydro-5H-[1]benzopyrano[3,4-d]pyridine.

EXAMPLE 5

2-benzyl-5,5-dimethyl-8-(2-heptyl)-10-hydroxy-1,2,3,4-tetrahydro-5H-[1]benzopyrano[3,4-d]pyridine (A) 5 - (2-heptyl)resorcinol.—A solution of 45 g. (0.19 mole) of 3′,5′-dimethoxy-hexanophenone in 400 ml. of dry ether was added dropwise to a freshly prepared solution of 0.30 mole of methyl magnesium iodide in 150 ml. of ether. The mixture was heated under reflux for one hour, cooled, and carefully decomposed with 275 ml. of saturated aqueous ammonium chloride. Separation of the ether layer, extraction of the aqueous phase with ether, and evaporation of the dried, combined extracts to dryness afforded 49.4 g. of 2-(3,5-dimethoxyphenyl)-2-heptanol as an oil, which was not further purified.

The latter was treated with 1 ml. of 20% sulfuric acid and heated at 105–125 C./35 mm. for an hour and a half. The mixture was then cooled and extracted with ether, and the ether extracts washed with aqueous sodium bicarbonate and water, dried over sodium sulfate, and evaporated to dryness. Distillation of the residue in vacuo gave 34.1 g. of 2-(3,5-dimethoxyphenyl)-2-heptene, B.P. 132–140° C./4 mm., $n_D^{25}$ 1.5251.

The latter (33 g., 0.14 mole), dissolved in 100 ml. of absolute ethanol, was reduced with hydrogen at 1,500 pounds p.s.i. over 6 g. of Raney nickel at 150° C. After removing the catalyst by filtration and evaporation of the filtrate to dryness, the residue was distilled in vacuo to give 26 g. of 2-(3,4-dimethoxyphenyl)heptane, B.P. 137–139° C./1 mm., $n_D^{25}$ 1.4957.

The latter (26 g., 0.11 mole), dissolved in 118 ml. (0.9 mole) of 57% hydriodic acid, was treated carefully with 156 ml. (1.6 moles) of acetic anhydride. When the exothermic reaction had subsided, the mixture was heated in an oil bath at 155° C. for two hours, cooled, and poured into a mixture of ice and water. The mixture was stored in a refrigerator overnight, and the gummy semisolid which separated was collected, washed with water, and dried over sulfuric acid to give 22.1 g. of 5-(2-heptyl)resorcinol which was not purified further.

(B) 2-benzyl-8-(2-heptyl)-10-hydroxy - 5 - oxo-1,2,3,4-tetrahydro - 5H[1]benzopyrano[3,4-d]pyridine.—Following a procedure similar to that described in Example 1A hereinabove, N-benzyl-4-carbethoxy-3-piperidone hydrochloride is reacted with 5-(2-heptyl)resorcinol in the presence of concentrated sulfuric acid and phosphorus oxychloride to give 2-benzyl-8-(2-heptyl)-10-hydroxy-5-oxo - 1,2,3,4 - tetrahydro-5H-[1]benzopyrano[3,4-d]pyridine.

(C) The latter is reacted with methyl magnesium iodide following the procedure of Example 1B hereinabove to give 2-benzyl-5,5-dimethyl-8-(2-heptyl)-10-hydroxy - 1,2,3,4 - tetrahydro - 5H - [1]benzopyrano[3,4-d]pyridine.

EXAMPLE 6

2-benzyl - 8 - (1 - cyclohexylethyl)-5,5-dimethyl-10-hydroxy - 1,2,3,4 - tetrahydro-5H-[1]benzopyrano[3,4-d]pyridine (A) 5-(1-cyclohexylethyl)resorcinol.—To a solution of cyclohexyl magnesium chloride [prepared from 177.1 g. (1.5 moles) of chlorocyclohexane and 24.3 g. (1.0 g. atom) of magnesium] in 300 ml. of ether was added 45.2 g. (0.25 mole) of 3,5-dimethoxybenzamide in portions over a period of one hour. The mixture was stirred and refluxed for fifty hours, allowed to stand at room temperature for sixty-four hours, and then poured into one liter of crushed ice and water containing 80 ml. of concentrated sulfuric acid. The organic layer was separated, the aqueous phase extracted with ether, and the combined ether extracts washed with saturated sodium chloride, dried over anhydrous magnesium sulfate, charcoaled, filtered, and taken to dryness yielding an oil which was distilled in vacuo to give 39.3 g. of cyclohexyl 3,5-dimethoxyphenyl ketone, B.P. 141–162° C./0.1 mm., $n_D^{25}$ 1.5403.

The latter (39 g., 0.157 mole), dissolved in 200 ml. of ether, was reacted with 0.2 mole of methyl magnesium iodide following a procedure similar to that used in Example 4A hereinabove to give 40.6 g. of 1-cyclohexyl-1-(3,5-dimethoxyphenyl)ethanol.

The latter was reacted with 1.0 ml. of 20% sulfuric acid at 130–140° C. for thirty minutes following a procedure similar to that used in Example 5A hereinabove to give 27.7 g. of [1-(3,5-dimethoxyphenyl)ethylidenyl] cyclohexane, B.P. 114–120° C./0.1 mm., $n_D^{25}$ 1.5408.

The latter (27 g., 0.11 mole) was reduced with hydrogen over Raney nickel following a procedure similar to that used in Example 5A hereinabove to give 20.8 g. of 5-(1-cyclohexylethyl)-1,3-dimethoxybenzene, B.P. 115–118° C./0.12 mm., $n_D^{25}$ 1.5262. The latter (0.084 mole) was demethylated with 84 ml. of hydriodic acid in 84 ml. of acetic anhydride following a procedure similar to that used in Example 5A hereinabove to give 14.7 g. of 5-(1-cyclohexylethyl)resorcinol, M.P. 65–69° C.

(B) 2-benzyl - 8 - (1 - cyclohexylethyl)-10-hydroxy-5-oxo - 1,2,3,4 - tetrahydro - 5H - [1]benzopyrano[3,4-d]pyridine.—Following a procedure similar to that described in Example 1A hereinabove N-benzyl-4-carbethoxy-3-piperidone hydrochloride is reacted with 5-(1-cyclohexylethyl)resorcinol in the presence of concentrated sulfuric acid and phosphorus oxychloride to give 2-benzyl-8-(1-cyclohexylethyl) - 10 - hydroxy-5-oxo-1,2,3,4-tetrahydro-5H-[1]benzopyrano[3,4-d]pyridine.

(C) The latter is reacted with methyl magnesium iodide following the procedure of Example 1B hereinabove to give 2-benzyl-8-(1-cyclohexylethyl) - 5,5 - dimethyl-10-hydroxy - 1,2,3,4 - tetrahydro-5H-[1]benzopyrano[3,4-d] pyridine.

EXAMPLE 7

2-benzyl - 8 - (3 - cyclopropyl-2-propyl)-5,5-dimethyl-10-hydroxy - 1,2,3,4 - tetrahydro - 5H - [1]benzopyrano-[3,4-d]pyridine (A) 5-(3-cyclopropyl-2-propyl)resorcinol.—By reacting cyclopropylmethyl magnesium bromide with 3,5-dimethoxybenzamide; reacting the resulting cyclopropylmethyl 3,5-dimethoxyphenyl ketone with methyl magnesium iodide; dehydrating the resulting 1-cyclopropyl-2-(3,5-dimethoxyphenyl)-2-propanol with 20% sulfuric acid; reducing with hydrogen over Raney nickel the resulting 1-cyclopropyl-2-(3,5-dimethoxyphenyl)-1-propene; and demethylating the resulting 1-cyclopropyl-2-(3,5-dimethoxyphenyl)propane with hydriodic acid in acetic anhydride using the manipulative procedures given above in Examples 5A and 6A, there is obtained 5-(3-cyclopropyl-2-propyl)resorcinol.

(B) 2-benzyl-8-(3 - cyclopropyl-2-propyl)-10-hydroxy-5 - oxo - 1,2,3,4-tetrahydro - 5H - [1]benzopyrano[3,4-d] pyridine.—Following a procedure similar to that described in Example 1A hereinabove, N-benzyl-4-carbethoxy-3-piperidone is reacted with 5-(3-cyclopropyl-2-propyl) resorcinol to give 2-benzyl-8-(3-cyclopropyl-2-propyl)-10-hydroxy - 5 - oxo - 1,2,3,4 - tetrahydro-5H-[1]benzo-pyrano[3,4-d]pyridine.

(C) The latter is reacted with methyl magnesium iodide following the procedure of Example 1B hereinabove to give 2-benzyl-8-(3-cyclopropyl-2-propyl)-5,5-dimethyl-10-hydroxy-1,2,3,4-tetrahydro - 5H - [1]benzopyrano[3,4-d] pyridine.

EXAMPLE 8

2 - benzyl - 5,5 - dimethyl - 10-hydroxy-8-(2-tetradecyl)-1,2,3,4-tetrahydro-5H-[1]benzopyrano[3,4-d]pyridine (A) 5 - (2 - tetradecyl)resorcinol.—Following a procedure similar to that described in Example 6A hereinabove, 0.2 mole of a Grignard reagent prepared from 60 g. (0.24 mole) of 1-bromododecane and 4.8 g. (0.20 atom) of magnesium was reacted with 9.05 g. (0.05 mole) of 3,5-dimethoxybenzamide in diethyl ether, and the resulting 1-dodecyl 3,5-dimethoxyphenyl ketone (43 g., 0.13 mole) was reacted with methyl magnesium iodide using a procedure similar to that used in Example 5A hereinabove. Dehydration of the resulting 2-(3,5-dimethoxyphenyl)-2-tetradecanol (13.5 g., 0.039 mole) with 1 ml. of 20% sulfuric acid to the corresponding 2-)3,5-dimethoxyphenyl)-2-tetradecene, catalytic reduction of the latter (26 g., 0.078 mole) with hydrogen over 6 g. of Raney nickel and cleavage of the resulting 2-(3,5-dimethoxyphenyl)tetradecane (20 g. 0.06 mole) with 60 ml. of 57% hydriodic acid in 60 ml. of acetic anhydride, all according to the procedure described in Example 5A hereinabove, afforded 15.7 g. of 5-(2-tetradecyl)-resorcinol, M.P. 61–63° C.

(B) 2 - benzyl - 10 - hydroxy - 5-oxo-8-(2-tetradecyl)-1,2,3,4 - tetrahydro-5H-[1]benzopyrano[3,4-d]pyridine.— Following a procedure similar to that described in Example 1A hereinabove, N-benzyl-4-carbethoxy-3-piperidone is reacted with 5-(2-tetradecyl)resorcinol in the presence of concentrated sulfuric acid and phosphorus oxychloride to give 2-benzyl-10-hydroxy-5-oxo-8-(2-tetradecyl) - 1,2,3,4 - tetrahydro-5H-[1]benzopyrano[3,4-d]pyridine.

(C) The latter is reacted with methyl magnesium iodide following the procedure of Example 1B hereinabove to give 2-benzyl-5,5-dimethyl-10-hydroxy-8-(2-tetradecyl)-1,2,3,4-tetrahydro-5H-[1]benzopyrano[3,4-d]pyridine.

EXAMPLE 9

2 - benzyl-5,5-dimethyl-8-(2-eicosyl)-10-hydroxy-1,2,3,4-tetrahydro-5H-[1]benzopyrano[3,4-d]pyridine (A) 5 - (2-eicosyl)resorcinol.—Following a procedure similar to that used in Example 6A hereinabove, a Grignard reagent, prepared from 333.4 g. (1.0 mole) of 1-bromoöctadecane and 24.3 g. (1.0 g. atom) of magnesium in 500 ml. of anhydrous ether was treated with 45.2 g. (0.25 mole) of 3,5-dimethoxybenzamide to give 58.9 g. of 1-octadecyl 3,5-dimethoxyphenyl ketone, M.P. 67–71° C.

The latter (56.5 g., 0.135 mole) slurried in 600 ml. of anhydrous ether and 100 ml. of tetrahydrofuran, was reacted with 0.2 mole of freshly prepared methyl magnesium iodide in 100 ml. of anhydrous ether following a procedure similar to that used in Example 5A hereinabove to give 48.1 g. of 2-(3,,5-dimethoxyphenyl)-2-eicosanol, M.P. 51–54° C.

The latter (27.1 g., 0.085 mole) was reacted with 1.0 ml. of 20% sulfuric acid at 130–140° C. for thirty minutes following a procedure similar to that used in Example 5A hereinabove to give 19.2 g. of 2-(3,5-dimethoxyphenyl)-2-eicosene, M.P. 35–37° C.

The latter (19 g., 0.046 mole) was reduced with hydrogen over 3 g. of Raney nickel following a procedure similar to that used in Example 5A hereinabove to give 14.8 g. of 2-(3,5-dimethoxyphenyl)eicosane which was demethylated with 35 ml. of 57% hydriodic acid in 35 ml. of acetic anhydride following a procedure similar to that used in Example 5A hereinabove to give 11.5 g. of 5-(2-eicosyl)resorcinol, M.P. 75.5–76.5° C.

(B) 2 - benzyl-8-(2-eicosyl)-10-hydroxy-5-oxo-1,2,3,4-tetrahydro - 5H - [1]benzopyrano[3,4-d]pyridine.—Following a procedure similar to that used in Example 1A hereinabove, N-benzyl-4-carbethoxy-3-piperidone is reacted with 5-(2-eicosyl)resorcinol to give 2-benzyl-8-(2-eicosyl) - 10 - hydroxy - 5-oxo - 1,2,3,4 - tetrahydro-5H-[1]benzopyrano[3,4-d]pyridine.

(C) The latter is reacted with methyl magesium iodide following the procedure of Example 1B hereinabove to give 2 - benzyl-5,5-dimethyl-8-(2-eicosyl)-10-hydroxy-1,2,3,4-tetrahydro-5H-[1]benzopyrano[3,4-d]pyridine.

EXAMPLE 10

5,5 - dimethyl - 10-hydroxy-8-(3-methyl-2-octyl)-1,2,3,4-tetrahydro-5H-[1]-benzopyrano[3,4-d]pyridine A solution of 2 g. (0.0044 mole) of 2-benzyl-5,5-dimethyl - 10-hydroxy-8-(3-methyl-2-octyl)-1,2,3,4-tetrahydro-5H-[1]benzopyrano[3,4-d]pyridine in 200 ml. of absolute ethanol and 4 ml. of glacial acetic acid was reduced with hydrogen at 43 pounds p.s.i. over 0.5 g. of a 10% palladium-on-charcoal catalyst. When reduction was complete (in about twenty-one hours), the mixture was filtered, the filtrate was evaporated to dryness and the residue dissolved in chloroform. The solution was washed first with aqueous sodium bicarbonate, then with water, dried over sodium sulfate, and evaporated to dryness, giving 1.49 g. of 5,5-dimethyl-10-hydroxy-8-(3-methyl-2-octyl) - 1,2,3,4-tetrahydro-5H-[1]benzopyrano[3,4-d]pyridine. Recrystallization of a small sample of the latter from petroleum ether (30–60° C.) afforded material of M.P. 114.5–116° C.

EXAMPLE 11

10 - hydroxy - 5,5,8 - trimethyl - 1,2,3,4 - tetrahydro-5H-[1]benzopyrano[3,4-d]-pyridine Following a procedure similar to that described in Example 10 hereinabove, 2-benzyl-10-hydroxy-5,5,8-trimethyl - 1,2,3,4-tetrahydro-5H-[1]benzopyrano[3,4-d]pyridine is catalytically debenzylated over a palladium-on-charcoal catalyst to give 10-hydroxy-5,5,8-trimethyl-1,2,3,4-tetrahydro-5H-[1]benzopyrano-[3,4-d]pyridine.

EXAMPLE 12

5,5-di-(1-hexyl)-10-hydroxy-8-methyl-1,2,3,4-tetrahydro-5H-[1]benzopyrano[3,4-d]pyridine Following a procedure similar to that described in Example 10 hereinabove, 2-benzyl-5,5-di-(1-hexyl)-10-hydroxy - 8 - methyl - 1,2,3,4 - tetrahydro-5H-[1]benzopyrano[3,4-d]pyridine is catalytically debenzylated over a palladium-on-charcoal catalyst to give 5,5-di-(1-hexyl)-10-hydroxy - 8 - methyl - 1,2,3,4 - tetrahydro-5H-[1] benzopyrano[3,4-d]pyridine.

EXAMPLE 13

5,5-dimethyl-10-hydroxy-8-(1-pentyl)1,2,4-tetrahydro-5H-[1]benzopyrano[3,4-d]pyridine Following a procedure similar to that described in Example 10 hereinabove, 2-benzyl-5,5-dimethyl-10-hydroxy - 8 - (1 - pentyl) - 1,2,3,4 - tetrahydro-5H-[1] benzopyrano[3,4-d]pyridine is catalytically debenzylated over a palladium-on-charcoal catalyst to give 5,5-dimethyl-10 - hydroxy - 8 - (1 - pentyl) - 1,2,3,4 - tetrahydro-5H-[1]benzopyrano[3,4-d]pyridine.

EXAMPLE 14

5,5-dimethyl-8-(2-heptyl)-10-hydroxy-1,2,3,4-tetrahydro-5H-[1]benzopyrano[3,4-d]pyridine Following a procedure similar to that described in Example 10 hereinabove, 2-benzyl - 5,5 - dimethyl-8-(2-heptyl) - 10 - hydroxy - 1,2,3,4 - tetrahydro - 5H - [1] benzopyrano[3,4-d]pyridine is catalytically debenzylated over a palladium-on-charcoal catalyst to give 5,5 - dimethyl - 8 - (2 - heptyl) - 10 - hydroxxy - 1,2,3,4 - tetrahydro - 5H - [1]benzopyrano[3,4-d]pyridine.

EXAMPLE 15

8-(1-cyclohexylethyl)-5,5-dimethyl-10-hydroxy-1,2,3,4-tetrahydro-5H-[1]benzopyrano[3,4-d]pyridine Following a procedure similar to that described in Example 10 hereinabove, 2-benzyl-8-(1-cyclohexylethyl)-5,5 - dimethyl - 10 - hydroxy - 1,2,3,4 - tetrahydro-5H-[1]benzopyrano[3,4-d]pyridine is catalytically debenzylated over a palladium-on-charcoal catalyst to give 8-(1-cyclohexylethyl) - 5,5 - dimethyl - 10 - hydroxy - 1,2,3,4-tetrahydro-5H-[1]benzopyrano[3,4-d]pyridine.

EXAMPLE 16

8-(3 - cyclopropyl - 2 - propyl)-5,5-dimethyl-10-hydroxy-1,2,3,4 - tetrahydro - 5H - [1]benzopyrano[3,4 - d] pyridine Following a procedure similar to that described in Example 10 hereinabove, 2-benzyl - 8 - (3-cyclopropyl-2-propyl) - 5,5 - dimethyl - 10 - hydroxy    1,2,3,4 - tetrahydro - 5H - [1]benzopyrano[3,4-d]pyridine is catalytically debenzylated over a palladium-on-charcoal catalyst to give 8-(3 - cyclopropyl - 2 - propyl) - 5,5 - dimethyl-10- hydroxy - 1,2,3,4 - tetrahydro - 5H - [1]benzopyrano[3,4-d]pyridine.

EXAMPLE 17

5,5-dimethyl-10-hydroxy-8-(2-tetradecyl)-1,2,3,4-tetrahydro-5H-[1]benzopyrano[3,4-d]pyridine Following a procedure similar to that described in Example 10 hereinabove, 2-benzyl - 5,5 - dimethyl - 10-hydroxy - 8 - (2 - tetradecyl) - 1,2,3,4 - tetrahydro - 5H-[1]benzopyrano[3,4-d]pyridine is catalytically debenzylated to give 5,5-dimethyl - 10 - hydroxy - 8 - (2-tetradecyl) - 1,2,3,4 - tetrahydro-5H-[1]benzopyrano[3,4-d]pyridine.

EXAMPLE 18

5,5-dimethyl-8-(2-eicosyl)-10-hydroxy-1,2,3,4-tetrahydro-5H-[1]benzopyrano[3,4-d]pyridine Following a procedure similar to that described in Example 10 hereinabove, 2-benzyl - 5,5 - dimethyl-8-(2-eicosyl) - 10 - hydroxy - 1,2,3,4 - tetrahydro - 5H - [1]benzopyrano[3,4-d]pyridine is catalytically debenzylated to give 5,5 - dimethyl - 8 - (2 - eicosyl) - 10 - hydroxy-1,2,3,4-tetrahydro - 5H - [1]benzopyrano[3,4-d]pyridine.

EXAMPLE 19

2-cinnamyl - 5,5 - dimethyl-10-hydroxy-8-(3 - methyl-2-octyl) - 1,2,3,4 - tetrahydro - 5H - [1]benzopyrano[3,4-d]pyridine A mixture of 0.8 g. (0.0022 mole) of 5,5-dimethyl-10-hydroxy - 8 - (3 - methyl - 2 - octyl) - 1,2,3,4 - tetrahydro-5H-[1]benzopyrano[3,4-d]pyridine, 0.34 g. (0.0022 mole) of cinnamyl chloride and 0.30 g. (0.0028 mole) of anhydrous sodium carbonate in 20 ml. of absolute ethanol was heated under reflux for sixteen hours. After cooling, the mixture was filtered, and the solid residue was extracted in a Soxhlet extractor with acetone. The solid which separated from the extract was collected and recrystallized once from acetone and once from isobutyl ketone to give 0.13 g. of 2-cinnamyl-5,5-dimethyl-10-hydroxy-8-(3 - methyl - 2 - octyl) - 1,2,3,4 - tetrahydro-5H-[1]benzopyrano[3,4-d]pyridine, M.P. 212–213° C.

EXAMPLE 20

5,5 - dimethyl - 10 - hydroxy - 8 - (3 - methyl - 2 - octyl)-2 - (2 - phenylethyl) - 1,2,3,4 - tetrahydro - 5H - [1]benzopyrano[3,4-d]pyridine To a solution of 1.9 g. (0.0053 mole) of 5,5-dimethyl-10 - hydroxy - 8 - (3 - methyl - 2 - octyl) - 1,2,3,4 - tetrahydro - 5H - [1]benzopyrano[3,4-d]pyridine in 20 ml. of dry benzene and 10 ml. of pyridine was added dropwise a solution of 2 g. (0.013 mole) of phenylacetyl chloride in 10 ml. of dry benzene. The mixture was then heated under reflux for two and a half hours, cooled, filtered, and the filtrate was evaporated to dryness. The residue was partitioned between water and chloroform, and the chloroform layer was separated, washed with water, dried over sodium sulfate, and taken to dryness to give 5,5-dimethyl - 10 - hydroxy - 8 - (3-methyl-2-octyl)-2 - phenylacetyl - 1,2,3,4 - tetrahydro - 5H - [1]benzopyrano[3,4-d]pyridine as a dark, viscous oil.

The latter, without further purification, was dissolved in 65 ml. of dry ether and the solution added dropwise to a suspension of 1.5 g. (0.04 mole) of lithium aluminum hydride in 75 ml. of dry ether. The mixture was heated under reflux for twenty hours, carefully treated with 10 ml. of water, and filtered. The filtrate was washed with water, dried over sodium sulfate, filtered, evaporated to dryness, and the residue recrystallized from acetonitrile to give 0.56 g. of 5,5-dimethyl - 10 - hydroxy - 8 - (3-methyl-2 - octyl) - 2 - (2 - phenylethyl) - 1,2,3,4 - tetrahydro-5H-[1]benzopyrano[3,4-d]pyridine, M.P. 176.5–178° C.

EXAMPLE 21

5,5 - dimethyl - 10 - hydroxy - 8 - (3 - methyl - 2 - octyl)-2 - [2 - (4 - methylphenyl)ethyl] - 1,2,3,4 - tetrahydro-5H-[1]benzopyrano[3,4-d]pyridine Following a procedure similar to that described in Example 19 hereinabove, 5,5-dimethyl - 10 - hydroxy-8-(3 - methyl - 2 - octyl) - 1,2,3,4 - tetrahydro - 5H - [1]benzopyrano[3,4-d]pyridine is reacted with 2-(4-methylphenyl)ethyl bromide in absolute ethanol in the presence of anhydrous sodium carbonate to give 5,5-dimethyl-10-hydroxy-8-(3-methyl - 2 - octyl)-2-[2-(4-methylphenyl)-ethyl]-1,2,3,4-tetrahydro - 5H - [1]benzopyrano[3,4-d]pyridine.

EXAMPLE 22

5,5 - dimethyl - 10 - hydroxy - 8 - (3-methyl-2-octyl)-2-[3 - (3,4-dimethoxyphenyl)-propyl] - 1,2,3,4-tetrahydro - 5H - [1]-benzopyrano[3,4-d]pyridine Following a procedure similar to that described in Example 19 hereinabove, 5,5-dimethyl-10-hydroxy-8-(3-methyl-2-octyl)-1,2,3,4-tetrahydro - 5H - [1]benzopyrano[3,4-d]pyridine is reacted with 3-(3,4-dimethoxyphenyl) propyl bromide in absolute ethanol in the presence of anhydrous sodium carbonate to give 5,5-dimethyl-10-hydroxy-8-(3-methyl-2-octyl) - 2 - [3-(3,4-dimethoxyphenyl) propyl]-1,2,3,4-tetrahydro - 5H - [1]benzopyrano-[3,4-d]pyridine.

EXAMPLE 23

5,5 - dimethyl - 10 - hydroxy - 8 - (3-methyl-2-octyl)-2-[1 - (2,4,6-tribromophenyl)-ethyl] - 1,2,3,4-tetrahydro-5H-[1]-benzopyrano[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 1 - (2,4,6 - tribromophenyl)ethyl bromide in absolute ethanol in the presence of anhydrous sodium carbonate to give 5,5-dimethyl-10-hydroxy - 8 - (3-methyl-2-octyl) - 2 - [1-(2,4,6-tribromophenyl)ethyl] - 1,2,3,4-tetrahydro - 5H - [1]benzopyrano[3,4-d]pyridine.

EXAMPLE 24

5,5 - dimethyl - 10 - hydroxy - 8 - (3-methyl-2-octyl)-2-[4-(4-nitrophenyl)butyl]-1,2,3,4-tetrahydro - 5H - [1]benzopyrano-[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 4-(4-nitrophenyl) butyl bromide in absolute ethanol in the presence of anhydrous sodium carbonate to give 5,5-dimethyl-10-hydroxy-8-(3-methyl - 2 - octyl)-2-[4-(4-nitrophenyl)-butyl]-1,2,3,4-tetrahydro - 5H - [1]benzopyrano[3,4-d]pyridine.

EXAMPLE 25

5,5 - dimethyl - 10 - hydroxy - 8 - (3-methyl-2-octyl)-2-[2-(4 - methylmercaptophenyl)ethyl] - 1,2,3,4-tetrahydro - 5H - [1]benzopyrano[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 2-(4-methylmercaptophenyl)ethyl bromide in absolute ethanol in the presence of anhydrous sodium carbonate to give 5,5-dimethyl-10-hydroxy - 8 -(3-methyl-2-octyl) - 2 - [2-(4-methylmercaptophenyl)ethyl]-1,2,3,4 - tetrahydro - 5H - [1]benzopyrano[3,4-d]pyridine.

EXAMPLE 26

5,5 - dimethyl - 10 - hydroxy - 8 - (3-methyl-2-octyl)-2-{3 - [1-(3,4 - methylenedioxyphenyl) - 1 - butenyl]}-1,2,3,4-tetrahydro-5H-[1]benzopyrano[3,4-d]pyridine Following a procedure similar to that described in Example 19 hereinabove, 5,5-dimethyl-10-hydroxy-8-(3- methyl - 2 - octyl) - 1,2,3,4 - tetrahydro-5H-[1]benzopyrano[3,4-d]pyridine is reacted with 3-[1-(3,4-methylenedioxyphenyl)-1-butenyl] bromide in absolute ethanol in the presence of anhydrous sodium carbonate to give 5,5-dimethyl - 10 - hydroxy-8-(3-methyl - 2 - octyl)-2-{3-[1-(3,4-methylenedioxyphenyl) - 1 - butenyl]} - 1,2,3,4-tetrahydro-5H-[1]benzopyrano[3,4-d]pyridine.

EXAMPLE 27

5,5 - dimethyl - 10 - hydroxy - 8 - (3-methyl-2-octyl)-2-{3 - [1 - (4-acetylaminophenyl) - 1 - butenyl}-1,2,3,4-tetrahydro-5H-[1]-benzopyrano[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 3-[(4-acetylaminophenyl) - 1 - butenyl] bromide in absolute ethanol in the presence of anhydrous sodium carbonate to give 5,5-dimethyl - 10 - hydroxy - 8 - (3-methyl-2-octyl)-2-{3-[1-(4-ocetylaminophenyl) - 1 - butenyl]}-1,2,3,4-tetrahydro-5H-[1]benzopyrano[3,4-d]pyridine.

EXAMPLE 28

5,5 - dimethyl - 10 - hydroxy - 8 - (3-methyl-2-octyl)-2-{4-[1-(3 - trifluoromethylphenyl) - 1 - butenyl]-1,2,3,4-tetrahydro - 5H - [1]benzopyrano[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 4-[1-(3-trifluoromethylphenyl) - 1 - butenyl] bromide in absolute ethanol in the presence of anhydrous sodium carbonate to give 5,5 - dimethyl - 10 - hydroxy 8-(3-methyl-10-hydroxy-8-(3-methyl - 2 - octyl)-2-{4 - [1-(3-trifluoromethylphenyl)-1 - butenyl]} - 1,2,3,4-tetrahydro - 5H - [1]benzopyrano[3,4-d]pyridine.

EXAMPLE 29

5,5 - dimethyl - 10 - hydroxy - 8 - (3-methyl-2-octyl)-2-{4 - [1 - (3-sulfamylphenyl)-1-butenyl]}-1,2,3,4-tetrahydro - 5H - [1]benzopyrano[3,4-d]pyridine Following a procedure similar to that described in Example 19 hereinabove, 5,5-dimethyl-10-hydroxy-8-(3-methyl - 2 - octyl)-1,2,3,4-tetrahydro - 5H - [1]benzopyrano[3,4-d]pyridine is reacted with 4-[1-(3-sulfamylphenyl) - 1 - butenyl] bromide in absolute ethanol in the presence of anhydrous sodium carbonate to give 5,5-dimethyl - 10 - hydroxy - 8 - (3-methyl-2-octyl)-2-{4-[1-(3-sulfamylphenyl) - 1 - butenyl]} - 1,2,3,4-tetrahydro-5H-[1]benzopyrano[3,4-d]pyridine.

EXAMPLE 30

2-allyl - 5,5-dimethyl - 10 - hydroxy-8-(3-methyl-2-octyl)-1,2,3,4-tetrahydro-5H-[1]benzopyrano[3,4-d]pyridine Following a procedure similar to that described in Example 19 hereinabove, 1.6 g. (0.004 mole) of 5,5-dimethyl 10 - hydroxy - 8 - (3 - methyl - 2 - octyl) - 1,2,3,4-tetrahydro - 5H - [1]-benzopyrano[3,4-d] pyridine was reacted with 0.52 g. (0.004 mole) of allyl bromide in absolute ethanol in the presence of 0.6 g. of sodium carbonate to yield 0.91 g. of 2-allyl-5,5-dimethyl-10-hydroxy-8-(3-methyl-2-octyl) - 1,2,3,4 - tetrahydro - 5H - [1]benzopyrano[3,4-d]pyridine, M.P. 174–175° C.

EXAMPLE 31

5,5-dimethyl - 10 - hydroxy - 2 - (3-methyl 2-butenyl)-8-(3-methyl - 2 - octyl)-1,2,3,4-tetrahydro-5H-[1]benzopyrano[3,4-d]pyridine Following a procedure similar to that described in Example 19 hereinabove, 0.80 g. (0.0022 mole) of 5,5-dimethyl - 10 - hydroxy - 8 - (3-methyl-2-octyl)-1,2,3,4-tetrahydro - 5H - [1]benzopyrano[3,4-d]pyridine was reacted with 0.33 g. (0.0022 mole) of 1-bromo-3-methyl-2-butene in 20 ml. of anhydrous dimethylformamide in the presence of 0.5 g. of sodium bicarbonate to yield 0.15 g. of 5,5-dimethyl - 10 - hydroxy-2-(3-methyl-2-butenyl)-8-(3-methyl - 2 - octyl)-1,2,3,4-tetrahydro - 5H - [1]benzopyrano[3,4-d]pyridine, M.P. 177–179° C.

EXAMPLE 32

2-[1-(trans-3-chloro - 2 - propenyl)]-5,5-dimethyl-10-hydroxy-8-(3-methyl - 2 - octyl)-1,2,3,4-tetrahydro-5H-[1]-benzopyrano[3,4-d]pyridine Following a procedure similar to that described in Example 19 hereinabove, 0.80 g. (0.0022 mole) of 5,5-dimethyl-10-hydroxy-8-(3-methyl - 2 - octyl)-1,2,3,4-tetrahydro-5H-[1]benzopyrano[3,4-d]pyridine was reacted with 0.24 g. (0.22 mole) of trans-1,3-dichloro-2-propene in 20 ml. of absolute ethanol in the presence of 0.3 g. of anhydrous sodium carbonate to yield 0.21 g. of 2-[1-(trans-3-chloro - 2 - propenyl)]-5,5-dimethyl-10-hydroxy-8-(3-methyl-2-octyl) - 1,2,3,4 - tetrahydro-5H-[1]benzopyrano[3,4-d]pyridine, M.P. 171–172° C.

EXAMPLE 33

2-[1-(cis-3-chloro - 2 - propenyl)]-5,5-dimethyl-10-hydroxy-8-(3-methyl-2-octyl) - 1,2,3,4 - tetrahydro-5H-[1]-benzopyrano[3,4-d]pyridine Following a procedure similar to that described in Example 19 hereinabove, 0.80 g. (0.0022 mole) of 5,5-dimethyl-10-hydroxy-8-(3 - methyl - 2 - octyl)-1,2,3,4-tetrahydro-5H-[1]-benzopyrano[3,4-d]pyridine was reacted with 0.24 g. (0.0022 mole) of cis-1,3-dichloro-2-propene in 20 ml. of absolute ethanol in the presence of 0.3 g. of anhydrous sodium carbonate to yield 0.30 g. of 2-[1-(cis-3-chloro - 2 - propenyl)]-5,5-dimethyl-10-hydroxy-8-(3-methyl-2-octyl) - 1,2,3,4 - tetrahydro-5H-[1] benzopyrano[3,4-d]pyridine, M.P. 160–162° C.

EXAMPLE 34

5,5-dimethyl - 10 - hydroxy-8-(3-methyl-2-octyl)-2-[3-(1-propynyl)] - 1,2,3,4 - tetrahydro - 5H - [1]benzopyrano[3,4-d]pyridine Following a procedure similar to that described in Example 19 hereinabove, 1.6 g. 0.004 mole) of 5,5-dimethyl-10-hydroxy-8-(3-methyl - 2 - octyl)-1,2,3,4-tetrahydro-5H-[1]-benzopyrano[3,4-d]pyridine was reacted with 0.52 g. (0.004 mole) of 3-bromo-1-propyne in 30 ml. of absolute ethanol in the presence of 0.6 g. of anhydrous sodium carbonate to yield 0.15 g. of 5,5-dimethyl-10-hydroxy-8-(3-methyl - 2 - octyl)-2-[3-(1-propynyl)]-1,2,3,4-tetrahydro - 5H - [1]benzopyrano[3,4-d]pyridine, M.P. 141.5–142° C.

EXAMPLE 35

2-cyclobutylmethyl - 5,5 - dimethyl - 10 - hydroxy-8-(3-methyl-2-octyl)-1,2,3,4-tetrahydro - 5H - [1]benzopyrano[3,4-d]pyridine Following a procedure similar to that described in Example 20 hereinabove, 1.6 g. (0.0044 mole) of 5,5-dimethyl-10-hydroxy-8-(3-methyl - 2 - octyl)-1,2,3,4-tetrahydro-5H-[1]-benzopyrano[3,4-d]pyridine dissolved in 10 ml. of dry benzene and 10 ml. of pyridine was reacted with 2.6 g. (0.022 mole) of cyclobutanecarbonyl chloride in 10 ml. of benzene, and the resulting 2-cyclobutanecarbonyl-5,5-dimethyl-10-hydroxy-8-(3-methyl - 2 - octyl)-1,2,3,4-tetrahydro-5H-[1]benzopyrano[3,4 - d]-pyridine was reduced with 1.5 g. (0.04 mole) of lithium aluminum hydride in ether to give 0.31 g. of 2-cyclobutylmethyl-5,5-dimethyl-10-hydroxy-8-(3-methyl - 2 - octyl)1,2,3,4-tetrahydro-5H-[1]benzopyrano[3,4-d]pyridine, M.P. 182–184° C.

EXAMPLE 36

2-acetyl-5,5-dimethyl - 10 - hydroxy-8-(3-methyl-2-octyl)-1,2,3,4-tetrahydro-5H-[1]benzopyrano[3,4-d]pyridine A solution of 3.357 g. (0.001 mole) of 5,5-dimethyl-10-hydroxy-8-(3-methyl - 2 - octyl)-1,2,3,4-tetrahydro-5H-[1]benzopyrano[3,4-d]pyridine and 0.102 g. (0.001 mole)

of acetic anhydride in 5 ml. of benzene was heated under reflux for five minutes and then cooled in an ice bath. The solid which separated from the reaction mixture was collected, washed with cold benzene, and dried in vacuo over sodium hydroxide to yield 0.187 g. of 2-acetyl-5,5-dimethyl-10-hydroxy-8-(3-methyl - 2 - octyl)-1,2,3,4-tetrahydro-5H-[1]benzopyrano[3,4-d]pyridine, M.P. 160–161.5° C.

EXAMPLE 37

2-cyclopropylcarbonyl-5,5-dimethyl - 10 - hydroxy-8-(3-methyl-2-octyl) - 1,2,3,4 - tetrahydro-5H-[1]benzopyrano[3,4-d]pyridine Following a procedure similar to that described in Example 20 hereinabove, 1.6 g. (0.0044 mole) of 5,5-dimethyl-10-hydroxy - 8 - (3-methyl-2-octyl)-1,2,3,4-tetrahydro-5H-[1]benzopyrano[3,4-d]pyridine dissolved in 5 ml. of benzene and 10 ml. of pyridine was reacted with 0.46 g. (0.0044 mole) of cyclopropylcarbonyl chloride in 5 ml. of dry benzene to give 1 g. of 2-cyclopropylcarbonyl-5,5-dimethyl - 10 - hydroxy-8-(3-methyl-2-octyl)-1,2,3,4-tetrahydro - 5H - [1]benzopyrano[3,4-d]pyridine, M.P. 124.5–126° C.

EXAMPLE 38

5,5-dimethyl-10-hydroxy-8-(3-methyl - 2 - octyl)-2-(4-methylcyclohexylcarbonyl) - 1,2,3,4 - tetrahydro-5H-[1]benzopyrano-[3,4-d]pyridine By reacting 4-methylcyclohexane carboxylic acid with ethyl chloroformate in acetone in the presence of triethylamine and reacting the resulting mixed anhydride with 5,5-dimethyl-10-hydroxy-8-(3-methyl - 2 - octyl)-1,2,3,4-tetrahydro-5H-[1]benzopyrano[3,4-d]pyridine, there is obtained 5,5-dimethyl-10-hydroxy-8-(3-methyl - 2 - octyl)-2-(4 - methylcyclohexylcarbonyl - 1,2,3,4 - tetrahydro-5H-[1]benzopyrano[3,4-d]pyridine.

EXAMPLE 39

2-cyclopropylmethyl - 5,5 - dimethyl-10-hydroxy-8-(3-methyl - 2 - octyl) - 1,2,3,4 - tetrahydro-5H-[1]benzopyrano-[3,4-d]pyridine Following a procedure similar to that described in Example 20 hereinabove, 0.82 g. (0.002 mole) of 2-cyclopropylcarbonyl-5,5-dimethyl - 10 - hydroxy-8-(3-methyl-2-octyl) - 1,2,3,4 - tetrahydro-5H-[1]benzopyrano [3,4-d]pyridine was reduced with 1.5 g. (0.04 mole) of lithium aluminum hydride in ether to give 0.29 g. of 2-cyclopropylmethyl - 5,5 - dimethyl - 10 - hydroxy-8-(3-methyl-2-octyl) - 1,2,3,4 - tetrahydro-5H-[1]benzopyrano [3,4-d]pyridine, M.P. 173.5–175° C.

EXAMPLE 40

5,5-dimethyl-10-hydroxy-8-(3-methyl - 2 - octyl)-2-(3-phenyl-2-propynyl)-1,2,3,4-tetrahydro - 5H - [1]benzopyrano[3,4-d]pyridine Following a procedure similar to that described in Example 19 hereinabove, 5,5-dimethyl-10-hydroxy-8-(3-methyl - 2 -octyl)-1,2,3,4-tetrahydro-5H-[1]benzopyrano [3,4-d]pyridine is reacted with 3-phenyl-2-propynyl bromide in absolute ethanol in the presence of anhydrous sodium carbonate to give 5,5-dimethyl-10-hydroxy-8-(3-methyl-2-octyl) - 2 - (3-phenyl-2-propynyl)-1,2,3,4-tetrahydro-5H-[1]benzopyrano[3,4-d]pyridine.

EXAMPLE 41

10-hydroxy-2-[3-(1-propynyl)] - 5,5,8 - trimethyl-1,2,3,4-tetrahydro-5H-[1]-benzopyrano[3,4-d]pyridine Following a procedure similar to that described in Example 19 hereinabove, 10-hydroxy-5,5,8-trimethyl-1,2,3,4-tetrahydro-5H-[1]benzopyrano[3,4-d]pyridine is reacted with 3-bromo-1-propyne in absolute ethanol in the presence of anhydrous sodium carbonate to give 10-hydroxy-2-[3-(1-propynyl)] - 5,5,8 - trimethyl-1,2,3,4-tetrahydro-5H-[1]benzopyrano[3,4-d]pyridine.

EXAMPLE 42

5,5-di-(1-hexyl) - 10 - hydroxy - 8 - methyl-2-[3-(1-propylnyl)]-1,2,3,4-tetrahydro - 5H - [1]benzopyrano[3,4-d]pyridine Following a procedure similar to that described in Example 19 hereinabove, 5,5-di-(1-hexyl) - 10 - hydroxy-8-methyl-1,2,3,4-tetrahydro - 5H - [1]benzopyrano[3,4-d]pyridine is reacted with 3-bromo-1-propyne in absolute ethanol in the presence of anhydrous sodium carbonate to give 5,5-di-(1-hexyl)-10-hydroxy - 8 - methyl-2-[3-(1-propynyl)]-1,2,3,4-tetrahydro - 5H - [1]benzopyrano[3,4-d] pyridine.

EXAMPLE 43

5,5-dimethyl-10-hydroxy - 8 - (1-pentyl) - 2 - [3-(1-propynyl)]-1,2,3,4-tetrahydro - 5H - [1]benzopyrano[3,4-d]pyridine Following a procedure similar to that described in Example 19 hereinabove, 5,5-dimethyl-10-hydroxy-8-(1-pentyl)-1,2,3,4-tetrahydro - 5H - [1]benzopyrano[3,4-d]pyridine is reacted with 3-bromo-1-propyne in absolute ethanol in the presence of anhydrous sodium carbonate to give 5,5-dimethyl-10-hydroxy-8-(1-pentyl)-2-[3-(1-propynyl)] - 1,2,3,4 - tetrahydro - 5H - [1]benzopyrano[3,4-d]pyridine.

EXAMPLE 44

5,5-dimethyl-8-(2-heptyl) - 10 - hydroxy - 2 - [3-(1-propynyl)]-1,2,3,4-tetrahydro - 5H - [1]benzopyrano[3,4-d]pyridine Following a procedure similar to that described in Example 19 hereinabove, 5,5-dimethyl-8-(2-heptyl)-10-hydroxy-1,2,3,4-tetrahydro - 5H - [1]benzopyrano[3,4-d]pyridine is reacted with 3-bromo-1-propyne in absolute ethanol in the presence of anhydrous sodium carbonate to give 5,5-dimethyl-8-(2-heptyl)-10-hydroxy-2-[3-(1-propynyl)]-1,2,3,4-tetrahydro - 5H - [1]benzopyrano[3,4-d]pyridine.

EXAMPLE 45

8 - (1-cyclohexylethyl)-5,5-dimethyl-10-hydroxy-2-[3-(1-propynyl)]-1,2,3,4-tetrahydro - 5H - [1]benzopyrano-[3,4-d]pyridine Following a procedure similar to that described in Example 19 hereinabove, 8-(1-cyclohexylethyl)-5,5-dimethyl-10-hydroxy-1,2,3,4-tetrahydro - 5H - [1]benzopyrano-[3,4-d]pyridine is reacted with 3-bromo-1-propyne in absolute ethanol in the presence of anhydrous sodium carbonate to give 8-(1-cyclohexylethyl)-5,5-dimethyl-10-hydroxy-2-[3-(1-propynyl)] - 1,2,3,4-tetrahydro-5H-[1]benzopyrano[3,4-d]pyridine.

EXAMPLE 46

8-(3-cyclopropyl-2-propyl)-5,5-dimethyl - 10 - hydroxy-2-[3-(1-propynyl)]-1,2,3,4-tetrahydro - 5H - [1]benzopyrano[3,4-d]pyridine Following a procedure similar to that described in Example 19 hereinabove, 8-(3-cyclopropyl-2-propyl)-5,5-dimethyl-10-hydroxy - 1,2,3,4 - tetrahydro-5H-[1]benzopyrano[3,4-d]pyridine is reacted with 3-bromo-1-propyne in absolute ethanol in the presence of anhydrous sodium carbonate to give 8-(3-cyclopropyl-2-propyl)-5,5-dimethyl-10-hydroxy-2-[3-(1-propynyl)] - 1,2,3,4 - tetrahydro-5H-[1]benzopyrano[3,4-d]pyridine.

EXAMPLE 47

5,5 - dimethyl-10-hydroxy-2-[3-(1-propynyl)]-8-(2-tetradecyl)-1,2,3,4-tetrahydro - 5H - [1]benzopyrano[3,4-d]pyridine Following a procedure similar to that described in Example 19 hereinabove, 5,5-dimethyl-10-hydroxy-8-(2-tetradecyl)-1,2,3,4-tetrahydro - 5H - [1]benzopyrano[3,4-d]pyridine is reacted with 3-bromo-1-propyne in absolute ethanol in the presence of anhydrous sodium carbonate to give 5,5-dimethyl - 10 - hydroxy-2-[3-(1-propynyl)]-8-(2-tetradecyl)-1,2,3,4-tetrahydro - 5H - [1]benzopyrano[3,4-d]pyridine.

EXAMPLE 48

5,5 - dimethyl-8-(2-eicosyl) - 10 - hydroxy-2-[3-(1-propynyl)]-1,2,3,4-tetrahydro - 5H - [1]benzopyrano[3,4-d]pyridine Following a procedure similar to that described in Example 19 hereinabove, 5,5-dimethyl-8-(2-eicosyl)-10-hydroxy - 1,2,3,4 - tetrahydro - 5H - [1]benzopyrano[3,4-d]pyridine is reacted with 3-bromo-1-propyne in absolute ethanol in the presence of anhydrous sodium carbonate to give 5,5-dimethyl-8-(2-eicosyl) - 10 - hydroxy-2-[3-(1-propynyl)] - 1,2,3,4-tetrahydro-5H-[1]benzopyrano[3,4-d]pyridine.

EXAMPLE 49

10-acetoxy - 5,5 - dimethyl-8-(3-methyl-2-octyl)-2-[3-(1-propynyl)]-1,2,3,4 - tetrahydro - 5H - [1]benzopyrano-[3,4-d]pyridine By reacting 5,5-dimethyl - 10 - hydroxy-8-(3-methyl-2-oictyl)-2-[3-(1-propynyl)]-1,2,3,4 - tetrahydro - 5H - [1]benzopyrano[3,4-d]pyridine with acetic anhydride, there is obtained 10-acetoxy-5,5-dimethyl-8-(3-methyl-2-octyl)-2-[3-(1-propynyl)]-1,2,3,4-tetrahydro - 5H - [1]benzopyrano[3,4-d]pyridine.

EXAMPLE 50

5,5-dimethyl-8-(3-methyl - 2 - octyl)-10-methoxy-2-[3-(1-propynyl)]-1,2,3,4-tetrahydro - 5H - [1]benzopyrano-[3,4-d]pyridine By reacting 5,5-dimethyl - 10 - hydroxy-8-(3-methyl-2-octyl)-2-[3-(1-propynyl)] - 1,2,3,4 - tetrahydro - 5H - [1]benzopyrano-[3,4-d]pyridine with methyl iodide in the presence of sodium ethoxide, there is obtained 5,5-dimethyl-8-(3 - methyl-2-octyl)-10-methoxy-2-[3-(1-propynyl)]-1,2,3,4-tetrahydro-5H-[1]benzopyrano[3,4-d]pyridine.

EXAMPLE 51

10 - carbamyloxy - 5,5 - dimethyl-8-(3-methyl-2-octyl)-2-[3-(1-propynyl)]-1,2,3,4-tetrahydro - 5H - [1]benzopyrano[3,4-d]pyridine By reacting 5,5-dimethyl - 10 - hydroxy-8-(3-methyl-2-octyl)-2-[3-(1-propynyl)] - 1,2,3,4 - tetrahydro - 5H - [1]benzopyrano[3,4-d]pyridine with an equimolar amount of phosgene in the presence of dimethylaniline, and reacting the resulting chloroformate with liquid ammonia, there is obtained 10-carbamyloxy-5,5-dimethyl-8-(3-methyl-2-octyl) - 2 - [3-(1-propynyl)]-1,2,3,4-tetrahydro - 5H - [1]benzopyrano[3,4-d]pyridine.

EXAMPLE 52

5,5-dimethyl-10-(N-methylcabamyloxy) - 8 - (3-methyl-2-octyl) - 2 - [3-(1-propynyl)]-1,2,3,4-tetrahydro-5H-[1]benzopyrano[3,4-d]pyridine By reacting 5,5-dimethyl - 10 - hydroxy-8-(3-methyl-2-octyl) - 2 - [3-(1-propynyl)]-1,2,3,4-tetrahydro - 5H - [1]benzopyrano[3,4-d]pyridine with an equimolar amount of phosgene in the presence of dimethylaniline, and reacting the resulting chloroformate with methylamine, there is obtained 5,5 - dimethyl-10-(N-methylcarbamyloxy)-8-(3-methyl-2-octyl) - 2 - [3-(1-propynyl)]-1,2,3,4-tetrahydro-5H-[1]benzopyrano[3,4-d]pyridine.

EXAMPLE 53

5,5-dimethyl - 10 - (N,N-dimethylcarbamyloxy) - 8 - (3-methyl - 2 - octyl)-2-[3-(1-propynyl)]-1,2,3,4-tetrahydro-5H-[1]benzopyrano[3,4-d]pyridine By reacting 5,5-dimethyl - 10 - hydroxy-8-(3-methyl-2-octyl)-2-[3-(1-propynyl)] - 1,2,3,4 - tetrahydro - 5H - [1]benzopyrano[3,4-d]pyridine with an equimolar amount of phosgene in the presence of dimethylaniline, and reacting the resulting chloroformate with dimethylamine, there is obtained 5,5-dimethyl-10-(N,N-dimethylcarbamyloxy)-8-(3-methyl-2-octyl) - 2 - [3-(1-propynyl)]-1,2,3,4-tetrahydro-5H-[1]benzopyrano[3,4-d]pyridine.

EXAMPLE 54

5,5-dimethyl-8-(3-methyl-2-octyl) - 10 - phosphonyloxy-2-[3 - (1-propynyl)] - 1,2,3,4 - tetrahydro-5H-[1]benzopyrano-[3,4-d]pyridine By reacting 5,5 - dimethyl-10-hydroxy-8-(3-methyl-2-octyl) - 2 - [3 - (1 - propynyl)] - 1,2,3,4 - tetrahydro - 5H-[1]benzopyrano[3,4-d]pyridine with one molar equivalent amount of phosphorus oxychloride in an organic solvent inert under the conditions of the reaction, for example toluene, and in the presence of a basic catalyst, for example pyridine, and reacting the resulting dichlorophosphinate with aqueous potassium carbonate, there is obtained 5,5 - dimethyl - 8 - (3 - methyl - 2 - octyl) - 10-phosphonyloxy - 2 - [3 - (1 - propynyl)] - 1,2,3,4 - tetrahydro-5H-[1]benzopyrano[3,4-d]pyridine.

EXAMPLE 55

5,5-dimethyl - 10 - hydroxy-8-(3-methyl-2-octyl)-1,2,3,4,13,14-hexahydro-5H-[1]benzopyrano[3,4-d]pyridine By reducing 5,5 - dimethyl - 10 - hydroxy - 8 - 3-methyl - 2 - octyl) - 1,2,3,4 - tetrahydro - 5H - [1]benzopyrano[3,4-d]pyridine with hydrogen in absolute methanol over a Raney nickel catalyst, there is obtained 5,5-dimethyl - 10 - hydroxy - 8 - (3 - methyl - 2 - octyl) - 1,2,3,4,13,14-hexahydro-5H-[1]benzopyrano[3,4-d]pyridine.

EXAMPLE 56

10-hydroxy-5,5,8-trimethyl-1,2,3,4,13,14-hexahydro-5H-[1]benzopyrano-[3,4-d]pyridine Following a procedure similar to that described in Example 55 hereinabove, 10-hydroxy-5,5,8-trimethyl-1,2,3,4-tetrahydro - 5H - [1]benzopyrano[3,4 - d]pyridine is reduced with hydrogen to give 10-hydroxy-5,5,8-trimethyl-1,2,3,4,13,14 - hexahydro - 5H - [1]benzopyrano[3,4 - d]-pyridine.

EXAMPLE 57

5,5-di-(1-hexyl)-10-hydroxy-8-methyl-1,2,3,4,13,14-hexahydro-5H-[1]benzopyrano[3,4-d]pyridine Following a procedure similar to that described in Example 55 hereinabove, 5,5 - di(1 - hexyl)-10-hydroxy-8-methyl - 1,2,3,4 - tetrahydro - 5H - [1]benzopyrano[3,4-d]pyridine is reduced with hydrogen to give 5,5-di-(1-hexyl) - 10 - hydroxy - 8 - methyl - 1,2,3,4,13,14 - hexahydro-5H-[1]benzopyrano[3,4-d]pyridine.

EXAMPLE 58

5,5-dimethyl-10-hydroxy-8-(1-pentyl)-1,2,3,4,13,14-hexahydro-5H-[1]benzopyrano[3,4-d]pyridine Following a procedure similar to that described in Example 55 hereinabove, 5,5 - dimethyl - 10 - hydroxy - 8-(1 - pentyl) - 1,2,3,4 - tetrahydro - 5H - [1]benzopyrano [3,4-d]pyridine is reduced with hydrogen to give 5,5-dimethyl - 10 - hydroxy - 8 - (1 - pentyl) - 1,2,3,4,13,14-hexahydro-5H-[1]benzopyrano[3,4-d]pyridine.

EXAMPLE 59

5,5-dimethyl-8-(2-hexyl)-10-hydroxy-1,2,3,4,13,14-hexahydro-5H-[1]benzopyrano[3,4-d]pyridine Following a procedure similar to that described in Example 55 hereinabove, 5,5 - dimethyl - 8 - (2 - hexyl) - 10-hydroxy - 1,2,3,4 - tetrahydro - 5H - [1]benzopyrano[3,4-d]pyridine is reduced with hydrogen to give 5,5-dimethyl-8 - (2 - hexyl) - 10 - hydroxy - 1,2,3,4,13,14 - hexahydro-5H-[1]benzopyrano[3,4-d]pyridine.

EXAMPLE 60

8-(1-cyclohexylethyl)-5,5-dimethyl-10-hydroxy-1,2,3,4, 13,14-hexahydro-5H-[1]benzopyrano[3,4-d]pyridine Following a procedure similar to that described in Example 55 hereinabove, 8 - (1 - cyclohexylethyl) - 5,5-dimethyl - 10 - hydroxy - 1,2,3,4 - tetrahydro - 5H - [1] benzopyrano[3,4-d]pyridine is reduced with hydrogen to give 8 - (1 - cyclohexylethyl) - 5,5 - dimethyl - 10 - hydroxy - 1,2,3,4,13,14 - hexahydro - 5H - [1]benzopyrano-[3,4-d]pyridine.

EXAMPLE 61

8 - (3-cyclopropyl-2-propyl)-5,5-dimethyl - 10 - hydroxy-1,2,3,4,13,14-hexahydro - 5H - [1]benzopyrano[3,4-d] pyridine Following a procedure similar to that described in Example 55 hereinabove, 8 - (3 - cyclopropyl - 2 - propyl) 5,5 - dimethyl - 10 - hydroxy - 1,2,3,4 - tetrahydro - 5H-[1]benzopyrano[3,4-d]pyridine is reduced with hydrogen to give 8 - (3 - cyclopropyl - 2 - propyl) - 5,5 - dimethyl-10 - hydroxy - 1,2,3,4,13,14 - hexahydro - 5H - [1]benzopyrano[3,4-d]pyridine.

EXAMPLE 62

5,5-dimethyl-10-hydroxy-8-(2-tetradecyl)-1,2,3,4,13,14-hexahydro-5H-[1]benzopyrano[3,4-d]pyridine Following a procedure similar to that described in Example 55 hereinabove, 5,5 - dimethyl - 10 - hydroxy - 8-(2 - tetradecyl) - 1,2,3,4 - tetrahydro - 5H - [1]benzopyrano[3,4-d]pyridine is reduced with hydrogen to give 5,5 - dimethyl - 1 0- hydroxy - 8 - (2 - tetradecyl) - 1,2,3, 4,13,14-hexahydro-5H-[1]benzopyrano[3,4-d]pyridine.

EXAMPLE 63

5,5-dimethyl-8-(2-eicosyl)-10-hydroxy-1,2,3,4,13,14-hexahydro-5H-[1]benzopyrano[3,4-d]pyridine Following a procedure similar to that described in Example 55 hereinabove, 5,5 - dimethyl - 8 - (2 - eicosyl) 10 - hydroxy - 1,2,3,4 - tetrahydro - 5H - [1]benzopyrano [3,4-d]pyridine is reduced with hydrogen to give 5,5-dimethyl - 8 - (2 - eicosyl) - 10 - hydroxy - 1,2,3,4,13,14-hexahydro-5H-[1]benzopyrano[3,4-d]pyridine.

EXAMPLE 64

5,5-dimethyl-10-hydroxy-8-(3-methyl - 2 - octyl) - 2 - (2-phenylethyl)-1,2,3,4,13,14-hexahydro - 5H - [1]benzopyrano[3,4-d]pyridine Following a procedure similar to that described in Example 55 hereinabove, 5,5 - dimethyl - 10 - hydroxy - 8-(3 - methyl - 2 - octyl) - 2 - (2 - phenylethyl) - 1,2,3,4-tetrahydro - 5H - [1]benzopyrano[3,4 - d]pyridine is reduced with hydrogen to give 5,5-dimethyl-10-hydroxy-8-(3 - methyl - 2 - octyl) - 2 - (2 - phenylethyl) - 1,2,3,4, 13,14-hexahydro-5H-[1]benzopyrano[3,4-d]pyridine.

EXAMPLE 65

5,5-dimethyl-10-hydroxy-8-(3-methyl-2-octyl) - 2 - [2-(4-methylphenylethyl)] - 1,2,3,4,13,14 - hexahydro - 5H-[1]benzopyrano[3,4-d]pyridine Following a procedure similar to that described in Example 55 hereinabove, 5,5 - dimethyl - 10 - hydroxy - 8-(3 - methyl - 2 - octyl) - 2 - [2 - (4 - methylphenylethyl)]-1,2,3,4 - tetrahydro-5H-[1]benzopyrano[3,4-d]pyridine is reduced with hydrogen to give 5,5-dimethyl-10-hydroxy-8 - (3 - methyl - 2 - octyl) - 2 - [2 - (4 - methylphenylethyl)] - 1,2,3,4,13,14 - hexahydro - 5H - [1]benzopyrano [3,4-d]pyridine.

EXAMPLE 66

5,5-dimethyl-10-hydroxy-8-(3-methyl-2-octyl)-2-[3 - (3,4-dimethoxyphenylpropyl)] - 1,2,3,4,13,14 - hexahydro-5H-[1]benzopyrano[3,4-d]pyridine Following a procedure similar to that described in Example 55 hereinabove, 5,5 - dimethyl - 10 - hydroxy - 8- (3 - methyl - 2 - octyl) - 2 - [3 - (3,4 - dimethoxyphenylpropyl)] - 1,2,3,4 - tetrahydro - 5H - [1]benzopyrano [3,4-d]pyridine is reduced with hydrogen to give 5,5-dimethyl - 10 - hydroxy - 8 - (3 - methyl - 2 - octyl) - 2 - [3-(3,4 - dimethoxyphenylpropyl)] - 1,2,3,4,13,14 - hexahydro-5H-[1]benzopyrano[3,4-d]pyridine.

EXAMPLE 67

5,5 - dimethyl - 10-hydroxy-8-(3-methyl-2-octyl)-2-[2-(2,4,6-tribromophenylethyl)] - 1,2,3,4,13,14 - hexahydro-5H-[1]benzopyrano[3,4-d]pyridine Following a procedure similar to that described in Example 55 hereinabove, 5,5-dimethyl-10-hydroxy-8-(3-methyl-2-octyl) - 2 - [2-(2,4,6-tribromophenylethyl)]-1, 2,3,4 - tetrahydro - 5H-[1]benzopyrano[3,4,-d]pyridine is reduced with hydrogen to give 5,5-dimethyl-10-hydroxy - 8-(3-methyl-2-octyl)-2-[2-(2,4,6-tribromophenylethyl)] - 1,2,3,4,13,14 - hexahydro-5H-[1]benzopyrano-[3,4-d]pyridine.

EXAMPLE 68

5,5 - dimethyl - 10 - hydroxy-8-(3-methyl-2-octyl)-2-[4-(4 - nitrophenylbutyl)] - 1,2,3,4,13,14 - hexahydro-5H-[1]benzopyrano[3,4-d]pyridine Following a procedure similar to that described in Example 55 hereinabove, 5,5-dimethyl-10-hydroxy-8-(3-methyl-2-octyl)-2-[4-(4-nitrophenylbutyl] - 1,2,3,4 - tetrahydro - 5H-[1]benzo pyrano[3,4-d]pyridine is reduced with hydrogen to give 5,5-dimethyl-10-hydroxy-8-(3-methyl - 2 - octyl) - 2-[4-(4-nitrophenylbutyl)]-1,2,3,4, 13,14-hexahydro-5H-[1]benzopyrano-[3,4-d]pyridine.

EXAMPLE 69

5,5 - dimethyl - 10 - hydroxy-8-(3-methyl-2-octyl)-2-[2-(4 - methylmercaptophenylethyl)] - 1,2,3,4,13,14 - hexahydro-5H-[1]benzopyrano[3,4-d]pyridine Following a procedure similar to that described in Example 55 hereinabove, 5,5-dimethyl-10-hydroxy-8-(3-methyl - 2 - octyl) - 2 - [2-(4-methylmercaptophenylethyl)] - 1,2,3,4 - tetrahydro-5H-[1]benzopyrano [3,4-d] pyridine is reduced with hydrogen to give 5,5-dimethyl-10-hydroxy-8-(3-methyl-2-octyl)-2 - [2 - (4-methylmercaptophenylethyl)]-1,2,3,4,13,14 - hexahydro - 5H - [1] benzopyrano-[3,4-d]pyridine.

EXAMPLE 70

2 - cyclobutylmethyl - 5,5 - dimethyl - 10-hydroxy-8-(3-methyl - 2 - octyl)-1,2,3,4,13,14-hexahydro-5H-[1]-benzopyrano[3,4-d]pyridine Following a procedure similar to that described in Example 55 hereinabove, 2 - cyclobutylmethyl - 5,5-dimethyl - 10 - hydroxy - 8 - (3-methyl-2-octyl)-1,2,3,4-tetrahydro - 5H - [1]benzopyrano[3,4-d]pyridine is reduced with hydrogen to give 2 - cyclobutylmethyl-5,5-dimethyl-10 - hydroxy - 8 - (3-methyl-2-octyl)-1,2,3,4,13,14-hexahydro-5H-[1]benzopyrano[3,4-d]pyridine.

EXAMPLE 71

2 - acetyl - 5,5 - dimethyl - 10 - hydroxy-8-(3-methyl-2-octyl) - 1,2,3,4,13,14 - hexahydro - 5H - [1]benzopyrano[3,4-d]-pyridine Following a procedure similar to that described in Example 55 hereinabove, 2 - acetyl - 5,5 - dimethyl-10-hydroxy - 8 - (3-methyl-2-octyl) - 1,2,3,4-tetrahydro-5H-[1]benzopyrano[3,4-d]-pyridine is reduced with hydrogen to give 2 - acetyl - 5,5-dimethyl-10-hydroxy-8-(3-methyl - 2 - octyl) - 1,2,3,4,13,14 - hexahydro-5H-[1] benzopyrano[3,4-d]pyridine.

EXAMPLE 72

5,5 - dimethyl - 10 - hydroxy - 8 - (3-methyl-2-octyl)-2-propionyl - 1,2,3,4,13,14 - hexahydro - 5H - [1]benzopyrano[3,4-d]-pyridine Following a procedure similar to that described in Example 55 hereinabove, 5,5 - dimethyl - 10 - hydroxy-8-(3-methyl - 2 - octyl) - 2 - propionyl-1,2,3,4-tetrahydro - 5H - [1]benzopyrano[3,4-d]pyridine is reduced with hydrogen to give 5,5 - dimethyl - 10 - hydroxy-8-(3 - methyl - 2 - octyl)-2-propionyl-1,2,3,4,13,14-hexahydro-5H-[1]benzopyrano[3,4-d]pyridine.

EXAMPLE 73

5,5 - dimethyl - 10 - hydroxy-2-(4-methylcyclohexylcarbonyl) - 8 - (3-methyl-2-octyl)-1,2,3,4,13,14-hexhydro-5H-[1]benzopyrano[3,4-d]pyridine Following a procedure similar to that described in Example 55 hereinabove, 5,5 - dimethyl - 10-hydroxy-2-(4-methylcyclohexylcarbonyl) - 8 - (3 - methyl-2-octyl)-1,2,3,4 - tetrahydro - 5H - [1]benzopyrano[3,4-d]pyridine is reduced with hydrogen to give 5,5-dimethyl-10-hydroxy-2 - (4-methylcyclohexylcarbonyl) - 8 - (3-methyl-2-octyl) - 1,2,3,4,13,14-hexahydro-5H-[1]benzopyrano[3,4-d]pyridine.

EXAMPLE 74

2 - cyclopropylmethyl - 5,5-dimethyl-10-hydroxy-8-(3-methyl - 2 - octyl) - 1,2,3,4,13,14 - hexahydro-5H-[1]-benzopyrano[3,4-d]pyridine Following a procedure similar to that described in Example 55 hereinabove, 2-cyclopropylmethyl-5,5-dimethyl-10 - hydroxy - 8 - (3-methyl-2-octyl)-1,2,3,4-tetrahydro-5H - [1]benzopyrano[3,4-d]pyridine is reduced with hydrogen to give 2 - cyclopropylmethyl-5,5-dimethyl-10-hydroxy - 8 - (3 - methyl-2-octyl) - 1,2,3,4,13,14-hexahydro-5H-[1]benzopyrano[3,4-d]pyridine.

EXAMPLE 75

2 - benzyl - 5,5 - dimethyl - 10 - hydroxy - 8 - (3-methyl-2 - octyl) - 1,2,3,4,13,14 - hexahydro-5H-[1]benzopyrano[3,4-d]pyridine Following a procedure similar to that described in Example 19 hereinabove, 5,5 - dimethyl - 10-hydroxy-8-(3-methyl - 2 - octyl) - 1,2,3,4,13,14 - hexahydro-5H-[1]benzopyrano[3,4-d]pyridine is reacted with benzyl bromide in absolute ethanol in the presence of anhydrous sodium carbonate to give 2 - benzyl-5,5-dimethyl-10-hydroxy-8 - (3-methyl-2-octyl) - 1,2,3,4,13,14 - hexahydro - 5H - [1]benzopyrano[3,4-d]pyridine.

EXAMPLE 76

2 - cinnamyl - 5,5 - dimethyl - 10 - hydroxy - 8 - (3-methyl - 2 - octyl) - 1,2,3,4,13,14 - hexahydro - 5H-[1]benzopyrano[3,4-d]pyridine Following a procedure similar to that described in Example 19 hereinabove, 5,5-dimethyl-10-hydroxy-8-(3-methyl - 2 - octyl) - 1,2,3,4,13,14 - hexahydro - 5H - [1]benzopyrano[3,4-d]pyridine is reacted with cinnamyl chloride in absolute ethanol in the presence of anhydrous sodium carbonate to give 2-cinnamyl-5,5-dimethyl-10-hydroxy - 8 - (3-methyl-2-octyl) - 1,2,3,4,13,14-hexahydro-5H-[1]benzopyrano[3,4-d]pyridine.

EXAMPLE 77

5,5 - dimethyl - 10 - hydroxy - 8 - (3-methyl-2-octyl)-2-{3 - [1 - (3,4 - methylenedioxyphenyl) - 1 - butenyl]}-1,2,3,4,13,14-hexahydro - 5H - [1]benzopyrano[3,4-d]pyridine Following a procedure similar to that described in Example 19 hereinabove, 5,5-dimethyl-10-hydroxy-8-(3-methyl-2-octyl) - 1,2,3,4,13,14 - hexahydro - 5H - [1]benzopyrano[3,4-d]pyridine is reacted with 3-[1-(3,4-methylenedioxyphenyl) - 1 - butenyl]bromide in absolute ethanol in the presence of anhydrous sodium carbonate to give 5,5-dimethyl-10-hydroxy-8-(3-methyl-2-octyl) - 2 - {3-[1-(3,4-methylenedioxyphenyl)-1-butenyl]} - 1,2,3,4,13,14 - hexahydro-5H-[1]benzopyrano[3, 4-d]pyridine.

EXAMPLE 78

5,5 - dimethyl - 10 - hydroxy - 8 - (3 - methyl - 2 - octyl)-2 - {3 - [1 - (4 - acetylaminophenyl) - 1 - butenyl]} - 1,2, 3,4,13,14 - hexahydro - 5H - [1]benzopyrano[3,4-d]pyridine Following a procedure similar to that described in Example 19 hereinabove, 5,5-dimethyl - 10 - hydroxy-8-(3-methyl - 2 - octyl) - 1,2,3,4,13,14 - hexahydro - 5H-[1]benzopyrano[3,4-d]pyridine is reacted with 3-[1-(4-acetylaminophenyl)-1-butenyl] bromide in absolute ethanol in the presence of anhydrous sodium carbonate to give 5,5 - dimethyl - 10 - hydroxy - 8 - (3 - methyl - 2 - octyl)-2 - {3 - [1 - (4 - acetylaminophenyl) - 1 - butenyl]} - 1,2, 3,4,13,14-hexahydro-5H-[1]benzopyrano[3,4-d]pyridine.

EXAMPLE 79

5,5 - dimethyl - 10 - hydroxy - 8 - (3 - methyl - 2 - octyl)-2 - {4 - [1 - (3 - trifluoromethylphenyl) - 1 - butenyl]}-1,2,3,4,13,14 - hexahydro - 5H - [1]benzopyrano[3,4-d]pyridine Following a procedure similar to that described in Example 19 hereinabove, 5,5 - dimethyl - 10-hydroxy-8-(3-methyl - 2 - octyl) - 1,2,3,4,13,14 - hexahydro - 5H - [1]benzopyrano[3,4-d]-pyridine is reacted with 4-[1-(3-trifluoromethylphenyl)-1-butenyl] bromide in absolute ethanol in the presence of anhydrous sodium carbonate to give 5,5 - dimethyl - 10 - hydroxy - 8 - (3 - methyl - 2 - octyl)-2 - {4 - [1 - (3 - trifluoromethylphenyl) - 1 - butenyl]}-1,2, 3,4,13,14-hexahydro-5H-[1]benzopyrano[3,4-d]pyridine.

EXAMPLE 80

5,5 - dimethyl - 10 - hydroxy - 8 - (3 - methyl - 2 - octyl)-2 - {4 - [1 - (3 - sulfamylphenyl) - 1 - butenyl]} - 1,2,3, 4,13,14 - hexahydro - 5H - [1]benzopyrano[3,4 - d]pyridine Following a procedure similar to that described in Example 19 hereinabove, 5,5-dimethyl - 10 - hydroxy-8-(3-methyl - 2 - octyl) - 1,2,3,4,13,14 - hexahydro - 5H - [1]benzopyrano[3,4-d]pyridine is reacted with 4-[1-(3-sulfamylphenyl)-1-butenyl] bromide in absolute ethanol in the presence of anhydrous sodium carbonate to give 5,5-dimethyl - 10 - hydroxy - 8 - (3 - methyl - 2 - octyl) - 2 - {4-[1 - (3 - sulfamylphenyl) - 1 - butenyl]} - 1,2,3,4,13,14-hexahydro-5H-[1]-benzopyrano[3,4-d]hydridine.

EXAMPLE 81

2 - allyl - 5,5 - dimethyl - 10 - hydroxy - 8 - (3 - methyl - 2-octyl) - 1,2,3,4,13,14 - hexahydro - 5H - [1]benzopyrano[3,4-d]pyridine Following a procedure similar to that described in Example 19 hereinabove, 5,5-dimethyl-10-hydroxy-8-(3-methyl - 2 - octyl) - 1,2,3,4,13,14 - hexahydro - 5H - [1]benzopyrano[3,4-d]pyridine is reacted with allyl bromide in absolute ethanol in the presence of anhydrous sodium carbonate to give 2-allyl-5,5-dimethyl-10-hydroxy-8-(3-methyl - 2 - octyl) - 1,2,3,4,13,14 - hexahydro - 5H - [1]benzopyrano[3,4-d]pyridine.

EXAMPLE 82

5,5 - dimethyl - 10 - hydroxy - 2 - (3 - methyl - 2 - butenyl) - 8 - (3 - methyl - 2 - octyl) - 1,2,3,4,13,14 - hexahydro-5H-[1]benzopyrano[3,4-d]pyridine Following a procedure similar to that described in Example 19 hereinabove, 5,5-dimethyl-10-hydroxy-8-(3-methyl - 2 - octyl) - 1,2,3,4,13,14 - hexahydro - 5H - [1]benzopyrano[3,4-d]pyridine is reacted with 1-bromo-3-methyl-2-butene in absolute ethanol in the presence of anhydrous sodium carbonate to give 5,5-dimethyl-10-hydroxy - 2 - (3 - methyl - 2 - butenyl) - 8 - (3 - methyl - 2 - octyl) - 1,2,3,4,13,14 - hexahydro - 5H - [1]benzopyrano [3,4-d]pyridine.

EXAMPLE 83

2 - [1 - (trans - 3 - chloro - 2 - propenyl)] - 5,5 - dimethyl- 10 - hydroxy - 8 - (3 - methyl - 2 - octyl) - 1,2,3,4,13,14-hexahydro-5H-[1]benzopyrano-[3,4-d]pyridine Following a procedure similar to that described in Example 19 hereinabove, 5,5-dimethyl-10-hydroxy-8-(3-methyl - 2 - octyl) - 1,2,3,4,13,14 - hexahydro - 5H - [1] benzopyrano[3,4-d]pyridine is reacted with trans-1,3-dichloro-2-propene in absolute ethanol in the presence of anhydrous sodium carbonate to give 2-[1-(trans-3-chloro-2-propenyl)] - 5,5 - dimethyl - 10 - hydroxy - 8 - (3 - methyl-2 - octyl) - 1,2,3,4,13,14 - hexahydro - 5H - [1]benzopyrano[3,4-d]pyridine.

EXAMPLE 84

2 - [1 - (cis - 3 - chloro - 2 - propenyl)] - 5,5 - dimethyl- 10 - hydroxy - 8 - (3 - methyl - 2 - octyl) - 1,2,3,4,13, 14 - hexahydro - 5H - [1]benzopyrano[3,4-d]pyridine Following a procedure similar to that described in Example 19 hereinabove, 5,5-dimethyl-10-hydroxy-8-(3-methyl - 2 - octyl) - 1,2,3,4,13,14 - hexahydro - 5H - [1] benzopyrano[3,4-d]pyridine is reacted with cis-1,3-dichloro-2-propene in absolute ethanol in the presence of anhydrous sodium carbonate to give 2-[1-(cis-3-chloro-2-propenyl)] - 5,5 - dimethyl - 10 - hydroxy - 8 - (3 - methyl-2 - octyl) - 1,2,3,4,13,14 - hexahydro - 5H - [1]benzopyrano[3,4-d]pyridine.

EXAMPLE 85

5,5 - dimethyl - 10 - hydroxy - 8 - (3 - methyl - 2 - octyl)- 2 - [3 - (1 - pyropynyl)] - 1,2,3,4,13,14 - hexahydro- 5H - [1]benzopyrano[3,4-d]pyridine Following a procedure similar to that described in Example 19 hereinabove 5,5-dimethyl-10-hydroxy-8-(3-methyl - 2 - octyl) - 1,2,3,4,13,14 - hexahydro - 5H - [1]benzopyrano[3,4-d]pyridine is reacted with 3-bromo-1-propyne in absolute ethanol in the presence of anhydrous sodium carbonate to give 5,5-dimethyl-10-hydroxy-8-(3-methyl - 2 - octyl) - 2 - [3 - (1 - propynyl)] - 1,2,3,4,13, 14-hexahydro-5H-[1]benzopyrano[3,4-d]pyridine.

EXAMPLE 86

5,5 - dimethyl -10 - hydroxy - 8 - (3 - methyl - 2 - octyl)- 2 - (2 - phenylethyl) - 1,2,3,4,13,14 - hexahydro - 5H- [1]benzopyrano[3,4-d]pyridine By reacting 5,5-dimethyl-10-hydroxy-8-(3-methyl-2-octyl) - 1,2,3,4,13,14 - hexahydro - 5H - [1]benzopyrano [3,4-d]pyridine with phenylacetyl chloride in the presence of pyridine and reducing the resulting 5,5-dimethyl-10-hydroxy - 8 - (3 - methyl - 2 - octyl) - 2 - phenylacetyl - 1, 2,3,4,13,14-hexahydro-5H - [1]benzopyrano[3,4 - d]pyridine with lithium aluminum hydride using a procedure similar to that described in Example 20 hereinabove, there is obtained 5,5-dimethyl-10-hydroxy-8-(3-methyl-2-octyl)- 2 - (2 - phenylethyl) - 1,2,3,4,13,14 - hexahydro - 5H - [1] benzopyrano[3,4-d]pyridine.

EXAMPLE 87

2 - acetyl - 5,5 - dimethyl - 10 - hydroxy - 8 - (3 - methyl- 2 - octyl) - 1,2,3,4,13,14 - hexahydro - 5H - [1]benzopyrano[3,4-d] pyridine By reacting 5,5-dimethyl-10-hydroxy-8-(3-methyl-2-octyl) - 1,2,3,4,13,14 - hexahydro - 5H - [1]benzopyrano [3,4-d]pyridine with acetic anhydride using a procedure similar to that described in Example 36 hereinabove, there is obtained 2-acetyl-5,5-dimethyl-10-hydroxy-8-(3-methyl-2 - octyl) - 1,2,3,4,13,14 - hexahydro - 5H - [1]benzopyrano[3,4-d]pyridine.

EXAMPLE 88

10 - acetoxy - 5,5 - dimethyl - 8 - (3 - methyl - 2 - octyl)- 2 - [3 - (1 - propynyl)] - 1,2,3,4,13,14 - hexahydro-5H-[1]benzopyrano[3,4-d]pyridine By reacting 5,5-dimethyl-10-hydroxy-8-(3-methyl-2-octyl) - 2 - [3 - (1 - propynyl)] - 1,2,3,4,13,14 - hexahydro-5H-[1]benzopyrano[3,4-d]pyridine with acetic anhydride, there is obtained 10-acetoxy-5,5-dimethyl-8-(3-methyl - 2 - octyl) - 2 - [3 - (1 - propynyl)] - 1,2,3,4,13,14-hexahydro-5H-[1]benzopyrano[3,4-d]pyridine.

EXAMPLE 89

5,5-dimethyl-8-(3-methyl-2-octyl) - 10 - methoxy - 2 - [3- (1 - propynyl)] - 1,2,3,4,13,14 - hexahydro - 5H - [1] benzopyrano[3,4-d]pyridine By reacting 5,5-dimethyl-10-hydroxy - 8 - (3 - methyl-2-octyl)-2-[3-(1-propynyl)]-1,2,3,4,13,14 - hexahydro - 5H- [1]benzopyrano[3,4-d]pyridine with methyl iodide in the presence of sodium ethoxide, there is obtained 5,5-dimethyl-8-(3-methyl-2-octyl)-10-methoxy - 2 - [3-(1-propynyl)]-1,2,3,4,13,14-hexahydro - 5H - [1]benzopyrano [3,4-d]pyridine.

EXAMPLE 90

10-carbamyloxy-5,5-dimethyl-8-(3-methyl - 2 - octyl)-2- [3-(1-propynyl)]1,2,3,4,13,14 - hexahydro - 5H - [1] benzopyrano[3,4-d]pyridine By reacting 5,5-dimethyl-10-hydroxy - 8 - (3-methyl-2-octyl) - 2 - [3 - (1-propynyl)] - 1,2,3,4,13,14 - hexahydro-5H-[1]benzopyrano[3,4-d]pyridine with an equimolar amount of phosgene in the presence of dimethylaniline, and reacting the resulting chloroformate with liquid ammonia, there is obtained 10-carbamyloxy-5,5-dimethyl-8-(3-methyl-2-octyl)-2 - [3 - (1-propynyl)] - 1,2,3,4,13,14-hexahydro-5H-[1]benzopyrano[3,4-d]pyridine.

EXAMPLE 91

5,5-dimethyl-10-(N-methylcarbamyloxy) - 8 - (3 - methyl-2-octyl)-2-[3-(1-propynyl)]-1,2,3,4,13,14 - hexahydro-5H-[1]benzopyrano[3,4-d]pyridine By reacting 5,5-dimethyl-10-hydroxy - 8 - (3 - methyl-2-octyl)-2-[3-(1-propynyl)]-1,2,3,4,13,14 - hexahydro - 5H- [1]benzopyrano[3,4 - d]pyridine with an equimolar amount of phosgene in the presence of dimethylaniline, and reacting the resulting chloroformate with methylamine, there is obtained 5,5-dimethyl-10-(N-methylcarbamyloxy)-8-(3-methyl-2-octyl)-2-[3 - (1 - propynyl)]- 1,2,3,4,13,14-hexahydro - 5H - [1]benzopyrano[3,4 - d) pyridine.

EXAMPLE 92

5,5-dimethyl-10-(N,N - dimethylcarbamyloxy) - 8 - (3-methyl-2-octyl)-2-[3-(1 - propynyl)] - 1,2,3,4,13,14-hexahydro-5H-[1]benzopyrano-[3,4-d]pyridine By reacting 5,5-diemthyl-10-hydroxy-8 - (3 - methyl-2-octyl)-2-[3-(1-propynyl)[-1,2,3,4,13,14 - hexahydro - 5H- [1]-benzopyrano[3,4 - d]pyridine with an equimolar amount of phosgene in the presence of dimethylaniline, and reacting the resulting chloroformate with dimethylamine, there is obtained 5,5-dimethyl-10-(N,N-dimethylcarbamyloxy)-8-(3-methyl-2-octyl)-2-[3 - (1 - propynyl)] 1,2,3,4,13,14-hexahydro - 5H - [1]benzopyrano[1]benzopyrano[3,4-d]-pyridine.

EXAMPLE 93

5,5-dimethyl-8-(3-methyl-2-octyl) - 10 - phosphonyloxy-2- [3-(1-propynyl)]-1,2,3,4,13,14-hexahydro - 5H - [1] benzopyrano[3,4-d]pyridine By reacting 5,5-dimethyl-10-hydroxy-8 - (3 - methyl-2-octyl)-2-[3-(1-propynyl)]-1,2,3,4,13,14-hexahydro - 5H- [1]benzopyrano[3,4-d]pyridine with one molar equivalent amount of phosphorus oxychloride in an organic solvent inert under the conditions of the reaction, for example toluene, and in the presence of a basic catalyst, for example pyridine, and reacting the resulting dichlorophosphinate with aqueous potassium carbonate, there is obtained 5,5-dimethyl-8-(3-methyl-2-octyl)-10 - phosphonyloxy-2-[3-(1-propynyl)]-1,2,3,4,13,14 - hexahydro - 5H-[1]benzopyrano[3,4-d]pyridine.

We claim:
1. A compound having the formula

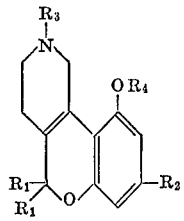

wherein $R_1$ is lower-alkyl; $R_2$ is a member of the group consisting of alkyl and cycloalkyl-lower-alkyl; $R_3$ is a member of the group consisting of hydrogen, lower-alkanoyl, cycloalkyl - lower alkyl, cycloalkyl - lower-alkanoyl lower-alkenyl, lower alkynyl, halo-lower-alkenyl, phenyl-lower-alkyl, phenyl - lower - alkenyl, and phenyl-lower-alkynyl; and $R_4$ is a member of the group consisting of hydrogen, lower-alkyl, lower-alkanoyl, carbamyl, N-lower-alkylcarbamyl, N,N-di-lower-alkylcarbamyl, and phosphonyl.

2. A compound having the formula

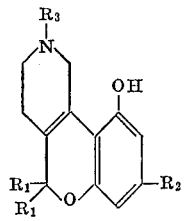

wherein $R_1$ is lower-alkyl; $R_2$ is alkyl; and $R_3$ is hydrogen.

3. A compound having the formula

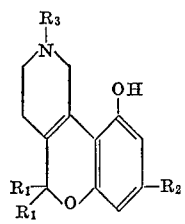

wherein $R_1$ is lower-alkyl; $R_2$ is alkyl; and $R_3$ is lower-alkanoyl.

4. A compound having the formula

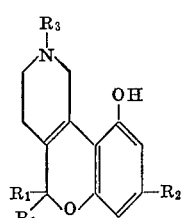

wherein $R_1$ is lower-alkyl; $R_2$ is alkyl; and $R_3$ is cycloalkyl-lower-alkyl.

5. A compound having the formula

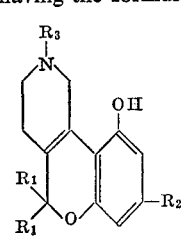

wherein $R_1$ is lower-alkyl; $R_2$ is alkyl; and $R_3$ is cycloalkyl-lower-alkanoyl.

6. A compound having the formula

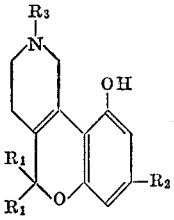

wherein $R_1$ is lower-alkyl; $R_2$ is cycloalkyl-lower-alkyl; and $R_3$ is lower-alkenyl.

7. A compound having the formula

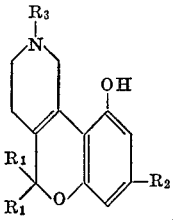

wherein $R_1$ is lower-alkyl; $R_2$ is alkyl; and $R_3$ is lower-alkynyl.

8. A compound having the formula

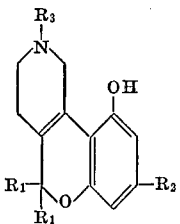

wherein $R_1$ is lower-alkyl; $R_2$ is alkyl; and $R_3$ is halo-lower-alkenyl.

9. A compound having the formula

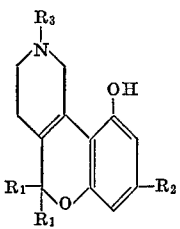

wherein $R_1$ is lower-alkyl; $R_2$ is alkyl; and $R_3$ is phenyl-lower-alkyl.

10. A compound having the formula

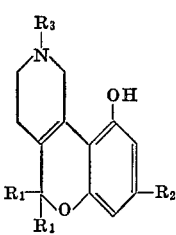

wherein $R_1$ is lower-alkyl; $R_2$ is alkyl; and $R_3$ is phenyl-lower-alkenyl.

11. 5,5 - dimethyl - 10 - hydroxy-8-(3-methyl-2-octyl)-1,2,3,4-tetrahydro-5H-[1]benzopyrano[3,4-d]pyridine.

12. 2 - acetyl - 5,5 - dimethyl-10-hydroxy-8-(3-methyl-2-octyl)-1,2,3,4-tetrahydro - 5H - [1]benzopyrano[3,4-d]pyridine.

13. 2 - cyclobutylmethyl - 5,5 - dimethyl-10-hydroxy-8-(3-methyl-2-octyl) - 1,2,3,4 - tetrahydro - 5H - [1]benzopyrano[3,4-d]pyridine.

14. 2 - cyclopropylmethyl - 5,5 - dimethyl-10-hydroxy-8-(3-methyl-2-octyl) - 1,2,3,4 - tetrahydro - 5H - [1]benzopyrano[3,4-d]pyridine.

15. 2 - cyclopropylcarbonyl - 5,5 - dimethyl - 10 - hydroxy - 8 - (3-methyl-2-octyl - 1,2,3,4 - tetrahydro-5H-[1]benzopyrano[3,4-d]pyridine.

16. 2 - allyl - 5,5 - dimethyl-10-hydroxy-8-(3-methyl-2-octyl) - 1,2,3,4 - tetrahydro-5H-[1]benzopyrano[3,4 - d]pyridine.

17. 5,5 - dimethyl - 10 - hydroxy - 2 - (3-methyl-2-butenyl)-8-(3 - methyl - 2 - octyl)-1,2,3,4-tetrahydro-5H-[1]benzopyrano[3,4-d]pyridine.

18. 5,5 - dimethyl - 10 - hydroxy-8-(3-methyl-2-octyl)-2 - [3 - (1 - propynyl)]-1,2,3,4-tetrahydro-5H-[1]benzopyrano[3,4-d]pyridine.

19. 2 - [1 - (trans - 3 - chloro-2-propenyl)]-5,5-dimethyl - 10 - hydroxy - 8 - (3-methyl-2-octyl)-1,2,3,4-tetrahydro-5H-[1]benzopyrano[3,4-d]pyridine.

20. 2-[1-(cis-3-chloro-2-propenyl)]-5,5-dimethyl - 10-hydroxy - 8 - (3-methyl-2-octyl)1,2,3,4-tetrahydro - 5H - [1]benzopyrano[3,4-d]pyridine.

21. 2 - benzyl - 5,5 - dimethyl-10-hydroxy-8-(3-methyl-2-octyl)1,2,3,4-tetrahydro - 5H - [1]benzopyrano[3,4-d]pyridine.

22. 5,5 - dimethyl - 10 - hydroxy-8-(3-methyl-2-octyl)-2-(2-phenylethyl) - 1,2,3,4 - tetrahydro - 5H - [1]benzopyrano[3,4-d]pyridine.

23. 2-cinnamyl - 5,5 - dimethyl-10-hydroxy-8-(3-methyl - 2 - octyl) - 1,2,3,4 - tetrahydro-5H-[1]benzopyrano[3,4-d]pyridine.

References Cited

UNITED STATES PATENTS

| 3,429,889 | 2/1969 | Shulgin | 260—295 |
| 3,514,464 | 5/1970 | Pars et al. | 260—295 |
| 3,294,810 | 12/1966 | Brossi et al. | 260—297 |

OTHER REFERENCES

Anker et al., J. Chem. Soc. (London), pp. 58–60 (1946).

Hickenbottom, Reactions of Organic Compounds, pp. 299 to 303 and 330 to 331, Longmans, Green and Co., N.Y. New Impression 1948.

Courts et al., J. Chem. Soc. 1952, pp. 334 to 337.

Pars et al., J. American Chem. Soc., vol. 88, pp. 3664 to 3665 (August 1966).

JOHN D. RANDOLPH, Primary Examiner

U.S. Cl. X.R.

260—258, 293.2, 294, 294.3, 294.7, 294.8, 295, 297, 591, 612, 615, 625, 665, 999